United States Patent [19]

Orii et al.

[11] Patent Number: 5,432,599
[45] Date of Patent: Jul. 11, 1995

[54] LIGHT INTENSITY DETECTION APPARATUS FOR A LUMINOUS FLUX WITH A CHANGING INCIDENT ANGLE

[75] Inventors: Fumito Orii, Chino; Noriyuki Iyama, Hachiohji; Toshihide Takechi, Anjoh; Kazuyoshi Sumiya, Hekinan, all of Japan

[73] Assignees: Olympus Optical Co., Ltd.; Nippondenso Co., Ltd., both of Japan

[21] Appl. No.: 67,675

[22] Filed: May 26, 1993

[30] Foreign Application Priority Data

May 27, 1992 [JP] Japan .................. 4-160198
May 12, 1993 [JP] Japan .................. 5-133854

[51] Int. Cl.6 .................. G01N 21/41; G05D 23/00
[52] U.S. Cl. .................. 356/218; 236/91 C
[58] Field of Search .................. 236/91 C; 126/578; 356/218, 225, 226; 359/837

[56] References Cited

U.S. PATENT DOCUMENTS 4,462,666  7/1984  Orban .................. 354/126
5,255,666  10/1993  Curchod .................. 359/742

FOREIGN PATENT DOCUMENTS 0254416  10/1989  Japan .................. 236/91 C

Primary Examiner—Richard A. Rosenberger
Assistant Examiner—Robert Kim
Attorney, Agent, or Firm—Adams & Wilks

[57] ABSTRACT

A temperature control system has a light intensity detection device for providing temperature compensation in accordance with the variation in angle of incident sunlight. The light intensity detection device includes a photoelectric device having a light receiving surface and which produces an electrical output signal in accordance with the intensity of received light. An optical device is disposed between a light source and the light receiving surface. Incident light transmitted through the optical device is re-directed to the light receiving surface by a plurality of prism surfaces disposed on the optical device facing the photoelectric device. The prism surfaces may be concentrically arranged around the optical axis of the photoelectric device. The surface area and angle of orientation of respective prism surfaces are predetermined such that the output electrical signal of the photoelectric device corresponds to a predetermined function in accordance with the thermal energy produced in the vicinity of the light intensity detection device as a function of the angle of incidence of incident light. Thus, the temperature, for example, in an automobile cabin may be precisely and accurately controlled and any variation in thermal energy within the interior of the cabin due to incident light may be compensated for.

16 Claims, 23 Drawing Sheets

F I G.17
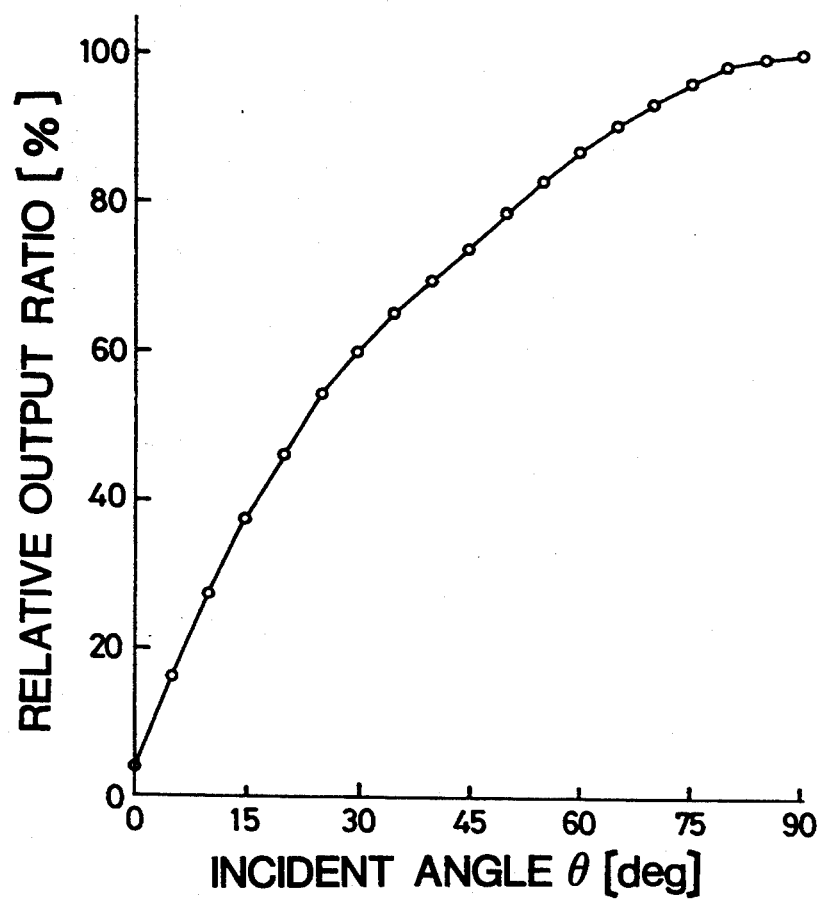

LIGHT INTENSITY DETECTION APPARATUS FOR A LUMINOUS FLUX WITH A CHANGING INCIDENT ANGLE

BACKGROUND OF THE INVENTION

1. Field of the Invention

The present invention relates to a light intensity detection device which includes a photoelectric device (photoelectric semiconductor device) having electric output characteristics which change in accordance with incident light intensity to detect the intensity of incident light which varies incident angle in accordance with incident angle caused by the movement of a light source such as the sun.

2. Discussion of the Related Art

A light intensity detection device has been used to detect visible incident light, infrared light, or other light using a photoelectric device for environment measurement or for control of various instruments based on the detected signals. For example, for all air conditioner in an automobile to control temperature in the cabin, only measurement of temperatures inside and outside the cabin using a temperature sensor and the control of temperature inside the cabin based on these measurements are not adequate to achieve a comfortable temperature in the cabin of the car. This is because if the sunlight entering the car hits people seated in these cabin, the people become warmer than the cabin temperature even if the temperature inside the cabin is low. Accordingly, in an air conditioner for an automobile, in addition to the temperature sensors inside and outside the car, a light intensity detection device is used to detect the amount of light entering the cabin of the car for control of temperatures in the cabin based on the detected results.

A conventional light intensity detection device is described in Japan Patent kokai No. 61(1986)-210915, which comprises a photoelectric device having a tight receiving surface, and a filter, which is arranged before the light receiving surface, and which includes a transparent resin plate which is coated with a light-proof agent or to which a light-proof agent is adhered. In this construction, by determining the concentration of the light screen according to the incident angles of light, amount of light entering the area covered with the filter is reduced to adjust the sensitivities of the photoelectric device to the incident angles, which allows detection of light with a similar sensitivity which enters the light receiving surface not only at the right angle but at an inclined angle.

However, in this conventional light amount detection device, the filter, which is arranged in front of the light receiving surface, including the transparent, resin plate which is coated with a light-proof agent or to which a light-proof agent is adhered, has to be assembled, which results in an increased number of parts and machining processes and causes a complicate construction.

Moreover, if light horizontally enters the light receiving surface of the photoelectric device, a sufficient output level cannot be obtained, which is detrimental to a stable output characteristic to all the incident light through the entire area from the vertical to the horizontal directions and makes it hard to gain a desired output characteristics to the incident angles even if necessary because of the complicated construction.

SUMMARY OF THE INVENTION

Under consideration of the foregoing situation, an object of the present invention is to provide a light intensity detection device which has a simple construction and allows to stabilize the output characteristics for the incident light angles from the vertical to the horizontal directions and to gain desired sensitivities.

A light intensity detection device according to the present invention is characterized in that it includes a photoelectric device having a electric output characteristic which changes with light intensity and an optical device with a group of prism surfaces of the light control surfaces which are so arranged that they face the light receiving surfaces of the photoelectric device.

Another light intensity detection device according to the present invention is characterized in that it includes a photoelectric device with an electric output characteristic which changes according to the intensity of light radiated at a light receiving surface thereof and is placed in the cabin of an automobile, and an optical device arranged facing said light receiving surface of said photoelectric device, wherein said optical device has plural steps of prism surfaces each of which the inclination angle away from the optical axis and the radiation area which are so determined that the electric outputs from said photoelectric device dependent on intensity of light radiated at said light receiving surface through said optical device are equal to the thermal loads which a person, being subject to solar radiation entering said cabin, actually feels.

In accordance with the above construction, even if an incident light angle changes with respect to the light receiving surface of the photoelectric device, incident light flux having the width determined for each incident angle reaches the light receiving surface of the photoelectric device through prism surfaces of the optical device, which allows to obtain a desired output characteristic to the incident angles over the entire area from the vertical to the horizontal directions.

BRIEF DESCRIPTION OF THE DRAWINGS

FIG. 17 is a relative output characteristic curve of a photoelectric device according to the second embodiment;

DETAILED EXPLANATION OF THE PREFERRED EMBODIMENTS

Figure 1:
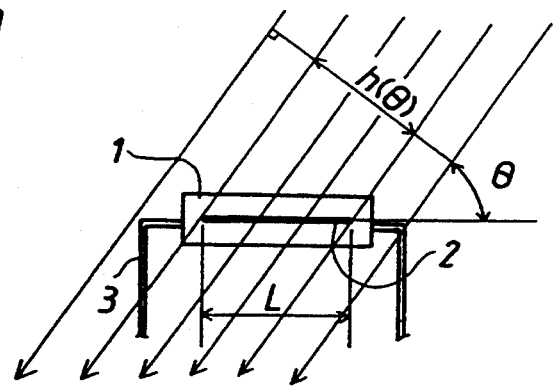
FIG. 1 is a side view showing in incident light in a photoelectric device in a first embodiment of the present invention.

FIG. 1 shows a photoelectric device 1 which comprises a light receiving surface 2 for receiving incident light and a lead 3 for the output of electric signals from the light receiving surface 2. As the photoelectric device i, a photoelectric semiconductor device with electric output characteristic which vary with incident light intensity is used.

Figure 2:
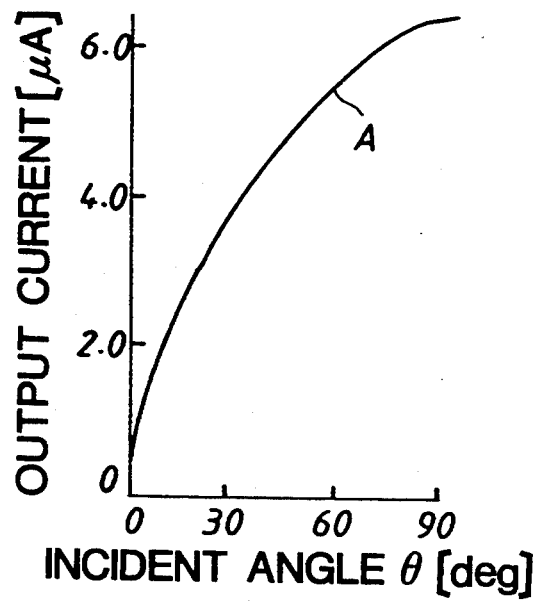
FIG. 2 is an output characteristic curve of a photoelectric device.

In FIG. 1, direct light incidence case is schematically shown and no obstacle is placed in front of photoelectric device 1 such that light flux directly hits the device 1. FIG. 2 shows an output current characteristic of the photoelectric device 1 versus the incident light angle $\alpha$ which is changed from 0° to 90° with respect to the light receiving surface 2 and which has an effective receiving area width L. The light flux width which effectively works on the light receiving surface 2 at the incident light angle $\theta$ is $h(\theta)$ and $h(\theta) = L.\sin\theta$. An output current $I(\theta)$ of the photoelectric device 1 is $I(\theta)=k.h(\theta)=k.L.\sin(\theta)$, that is, $I(\theta)$ is proportional to $h(\theta)$. The effective light flux width at $\theta=90°$ is $h_{90}$ and $h_{90}=L.\sin 90°=L$. Assuming that the output current $I_{90}$ is i(Amp) at $\theta=90°$, $I_{90}$ is shown by $I_{90}=i=k.L.\sin 90°$. Thus, the output current $I(\theta)$ at the incident angle $\theta$ has an output characteristic shown in FIG. 2 because $I(\theta)=i.\sin\theta$.

Figure 3:
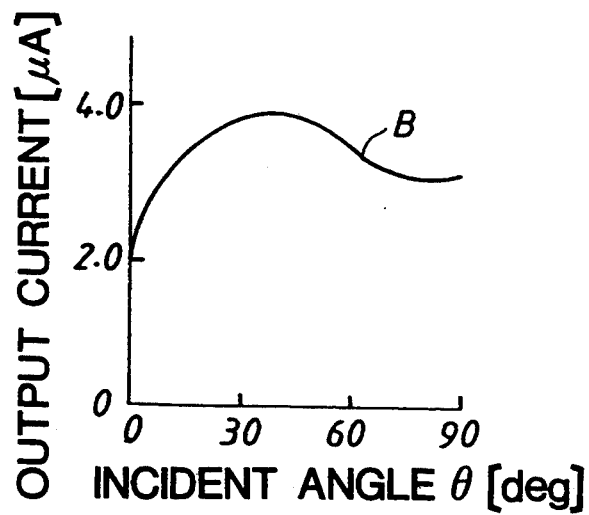
FIG. 3 is an output characteristic curve of a light intensity detection device.
Figure 4:
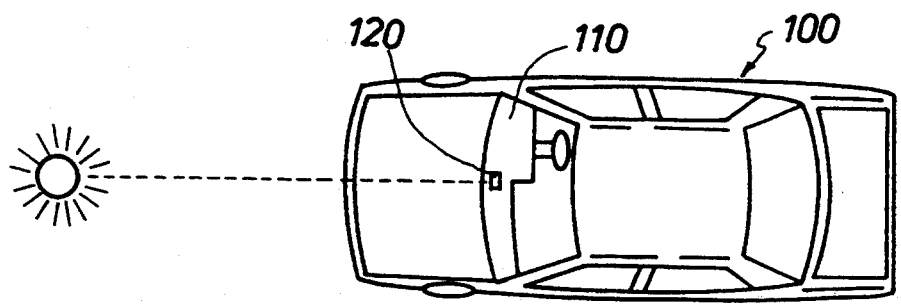
FIG. 4 is a plan view of an automobile in which a light amount detection device is applied.
Figure 5:
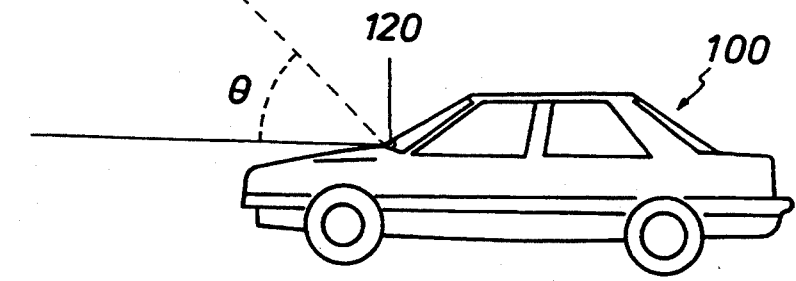
FIG. 5 is a side view of an automobile in which a light amount detection device is applied.

To apply a photoelectric device having this output characteristic into, for example, a solar detection device for an air conditioner in an automobile, an output curve shown in FIG. 3 is required. FIGS. 4 and 5 show a light intensity detection device 120 disposed on a dashboard 110 in an automobile 100. If a driver (not shown) sits on the front seat and is subject to sunlight incident through the windshield of the automobile 100, the driver feels higher temperatures as the incident sunlight angle $\theta$, or the attitude of the sun becomes higher, and the temperature the driver feels reaches the highest point in the range of incident light angles of 30°∼50°. When the sun rises higher, or the incident light angle becomes further increased, sunlight is prevented from entering the automobile by the roof. That is, a shade area in the automobile becomes large, which lowers the temperature the driver feels. The temperature the driver feels has a close relationship to the thermal load incident an automobile. As the attitude of incident solar radiation, that is, the incident light angle $\theta$ becomes larger, the solar radiation thermal load in an automobile changes substantially sinusoidally and reduces when the solar radiation height becomes larger than a certain value. Because light amount detection device 120 must have an output curve similar to that of the solar radiation thermal load, the output curve shown in FIG. 3 is required.

Figure 6:
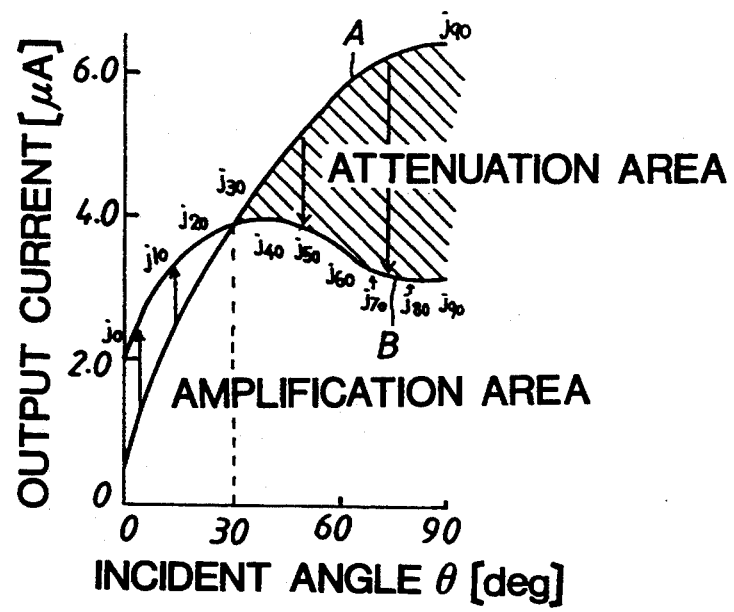
FIG. 6 is an adjusted output characteristic curve of a photoelectric device.

FIG. 6 shows comparative output curves to installing the amounts needed adjust the output curve A shown in FIG. 2 to form the output curve B shown in FIG. 3. The outputs in the range of incident light angles of $\theta=0°$ to approximately 30° must be amplified, while the outputs in the range of incident light angles of $\theta$ = approximately 30°~90° must be attenuated.

Figure 7:
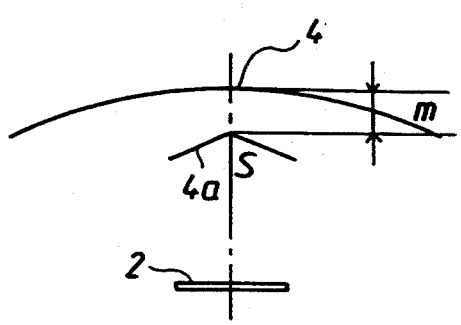
FIG. 7 is a sectional view of a photoelectric device.

The output current I for the incident light angle $\theta$ can be amplified or attenuated by widening or narrowing the incident light flux width $h(\theta)$ which effectively reaches the light receiving surface 2 of the photoelectric device 1. As a means to widen or narrow $h(\theta)$, an optical member (a prism member) 4 which comprises a group of selectively spaced prism surfaces made of plastics permeable to light is disposed, as shown in FIG. 7, between a light source and the photoelectric device 1 and facing the light receiving surface 2 of the photoelectric device 1.

Figure 8:
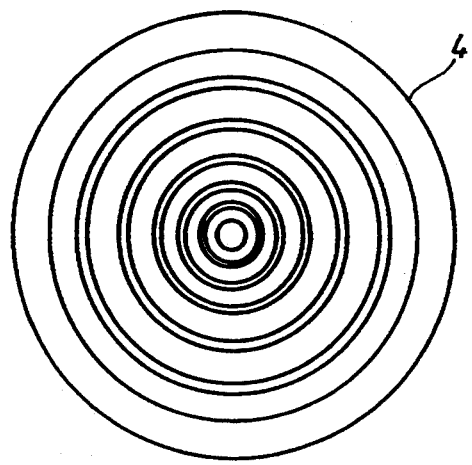
FIG. 8 is a bottom view of a photoelectric device.
Figure 12:
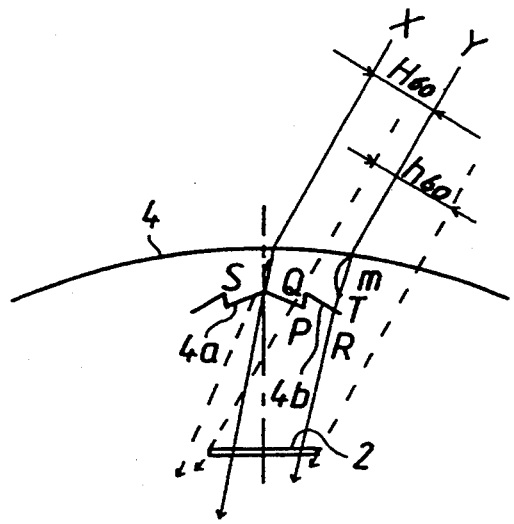
FIG. 12 is still another sectional view showing how a prism surface is determined in the first embodiment.

Plural prism surfaces $4a$, $4b$, ... are formed on the side of the optical member 4 facing the photoelectric device (FIG. 12). The angle of inclination with respect to the optical axis and the light flux radiation area (the width in the radiation direction of the surface containing the inclination angle) of each of the respective prism surfaces are so determined that they change for each prism surface. Thus, as shown in FIG. 8, viewed from the photoelectric device, plural prism surfaces are concentrically formed around the optical axis of the photoelectric device.

The determining procedure of the inclination angles and the light flux radiation areas of the Fresnel surfaces are now described.

(1) The light flux width correction factors $H_{90}$, $H_{80}$, ... and $H_0$, which are needed to obtain given outputs $j_{90}$, $j_{80}$, ... and $j_0$ (FIG. 6) when the incident light angle $\theta$ is changed from 90° to 0° in 10° increments, are obtained. These widths can be calculated by dividing the outputs $j_{90}$, $j_{80}$, ... and $j_0$ by the output $I_{90}$ at $\theta = 90°$, and by multiplying the effective light flux width $h_{90} = L$ at $\theta = 90°$ by the quotient obtained by the division.

Each of the calculated $H_{90}$, $H_{80}$, $H_{70}$, ..., $H_{10}$, and $H_0$ has a specific width to allow an adequate amplification factor or attenuation factor for each of the light flux widths $h_{90}$, $h_{80}$, $h_{70}$, ..., $h_{10}$, and $h_0$ at every angle in 10° increments which effectively work on an uncovered light receiving surface.

(2) Then, the orientation of each prism surface is determined such that light having one of the widths $H_{90}$, $H_{80}$, $H_{70}$, ..., $H_{10}$, and $H_0$ is just enough to effectively work on each light receiving surface of the photoelectric device. FIG. 7 shows a relationship between the optical member 4 on which the prism surfaces are formed and the light receiving surface 2 of a photoelectric device placed on the central line, or the optical axis of the optical device 4. In FIG. 7, a point S on the central line at a vertical distance m from the outer surface of the optical device toward the light receiving surface is the central point of a first prism surface $4a$, where m is a thickness of optical device 4.

Figure 9:
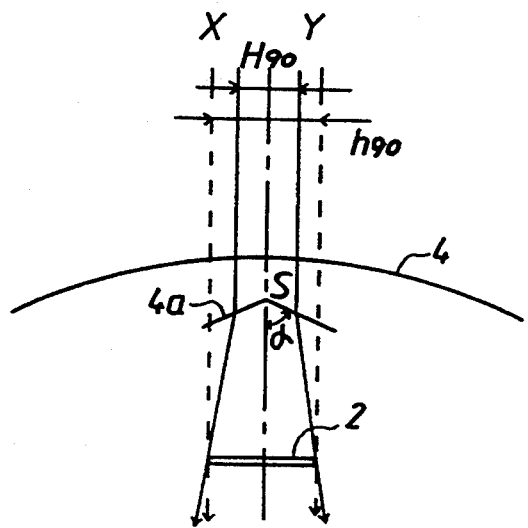
FIG. 9 is a sectional view showing the determination of a prism surface is in the first embodiment.

(3) Then, as shown in FIG. 9, an inclination angle $\alpha$ away from the central line of the prism surface $4a$ originating from the point S is so determined that light on the boundary between $H_{90}$ and the area given by X and Y passes through the optical device arid reaches the right arid left end sides through the prism surface $4a$ (which forms a single surface in three-dimension although two surfaces on the right and left sides are shown in FIG. 9) when light having the light flux width $H_{90}$, which is obtained by the above calculation, for an incident angle $\theta = 90°$ is directed equally from a light source to the outer surface of the optical device with respect to the central line.

Figure 10:
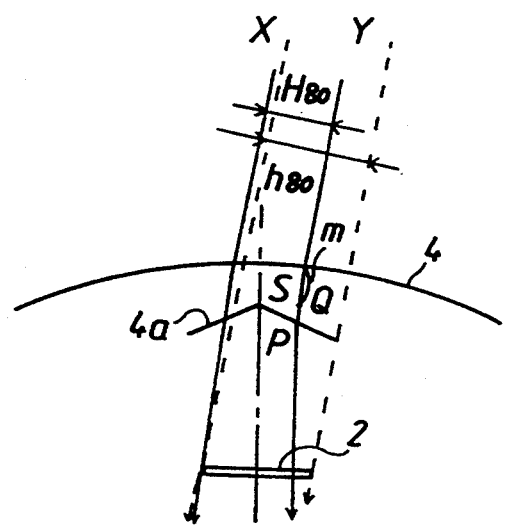
FIG. 10 is another sectional view showing how a prism surface is determined in the first embodiment.

(4) FIG. 10 shows an example in which light is radiated at the optical device 4 at an incident light angle $\theta = 80°$. In FIG. 10, X refers to light which is part of light passing through prism surface $4a$, which has the inclination angle $\theta$ defined in the step (3), and reaching light receiving surface 2 and which reaches the left most side of the light receiving surface 2. Y refers to light which is parallel to and distant from the light X toward the right side by a light flux width $H_{80}$ for an incident light angle $\theta = 80°$. P refers to a point where light travelling through the optical device 4 passes. The point P is defined as the terminal point of the prism surface $4a$ and thereby the inclination angle and the radiation area of the prism surface $4a$ are determined.

Furthermore, a point Q in the optical device where the thickness of the optical device is m is the origin of the second prism surface $4b$.

Figure 11:
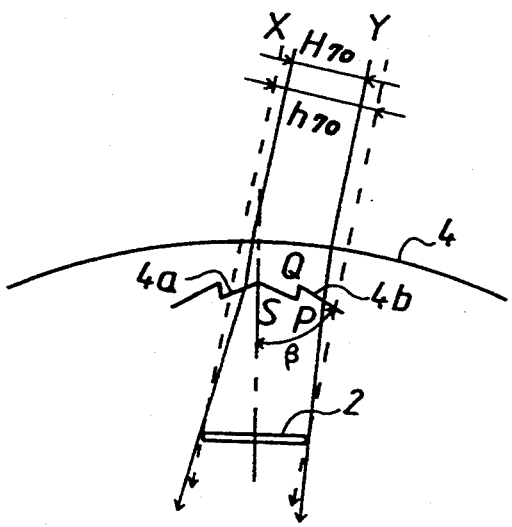
FIG. 11 is still another sectional view showing how a prism surface is determined in the first embodiment.

(5) FIG. 11 shows an example in which Light is radiated at the optical device 4 at an incident light angle $\theta = 70°$. X refers to light which is part of light, as refered to at $\theta = 80°$, passing through the prism surface $4a$ which has an inclination angle, and reaching the light receiving surface 2 and which reaches the left most side of light receiving surface 2. Y refers to light which is parallel to and distant from the light X toward the right side by a light flux width $H_{70}$ for an incident angle $\theta = 70°$. An inclination angle $\beta$ away from the central line of the prism surface $4b$ is so determined originating from the point Q that the light Y passes through the optical device and the second prism surface $4b$ to reach the right end side of the light receiving surface 2.

As mentioned above, the inclination angle and radiation area of each prism surface are determined, which allows $H_{90}$, $H_{80}$, and $H_{70}$ to effectively work on the light receiving surface without too much or too little.

(6) FIG. 12 shows a situation in which light is radiated at the optical device 4 at an incident angle $\theta = 60°$. A point R where light passes through the prism surface $4b$ having an incident angle $\beta$. The point R is defined as the terminal point of the second prism surface $4b$, and then the radiation area is determined. The inclination angle and the radiation area of each prism surface can be determined by repeating the steps (3)–(5).

(7) In the range of incident angles of 30°~0°, the outputs need to be amplified. An amplification factor for each incident angle $\theta$ is calculated. The light flux width $H(\theta)$ for each angle is calculated by multiplying the effective light flux width $h(\theta)$, which works on an uncovered light receiving surface, by the amplification factor.

Figure 13:
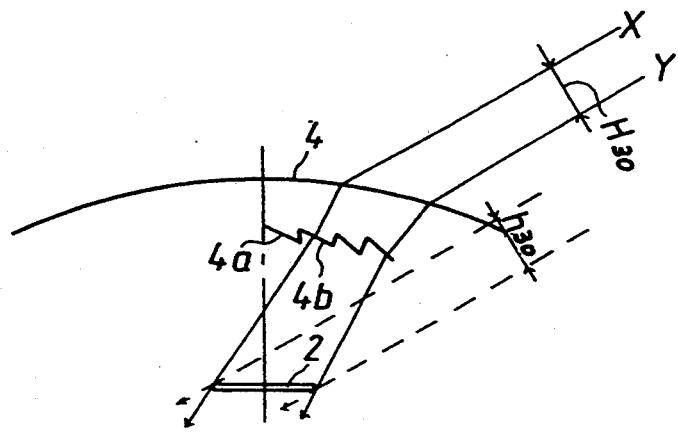
FIG. 13 is still another sectional view showing how a prism surface is determined in the first embodiment.
Figure 14:
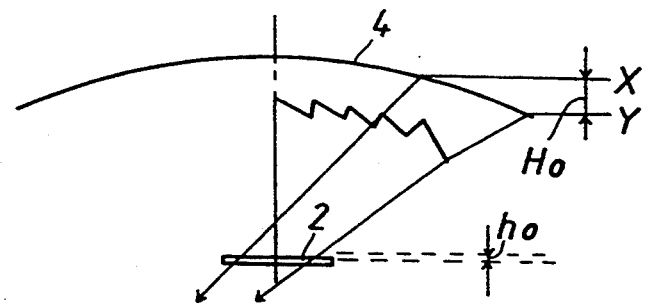
FIG. 14 is still another sectional view showing how a prism surface is determined in the first embodiment.

FIGS. 13 and 14 show incident light radiation at incident angles $\theta = 30°$ and $\theta = 0°$. The inclination angles and the radiation areas of the prism surfaces at $\theta = 30°$, 20°, 10°, and 0° can be obtained based on the effective light flux width $h(\theta)$ and the light flux width $H(\theta)$ calculated in the above description by repeating the steps (3)–(6).

Accordingly, a desired output curve can be obtained for the incident angles over the entire area by placing an optical device which has the above defined prism surfaces between the light source and the light receiving surface.

in this embodiment, the incident angle $\theta$ can be changed at partition steps of 10° or smaller, and thereby the output curve of the photoelectric device can be more accurately approximated. However, if the partition step is made smaller than a certain value, each edge of a prism surface interferes with light travelling toward the light receiving surface 2 or the steps of the prism surfaces in producing an optical device becomes too small. Partition steps of 3°~10° are practical.

in the above explanation, the outer shape of the optical device 4 on the side facing a light source is made spherical. However, the outer shape may be made conical or trapezoidal if incident light at an incident angle $\theta=0°$ passes through the prism surface and reaches the light receiving surface 2 of the photoelectric device 1.

Second Embodiment

Figure 15:
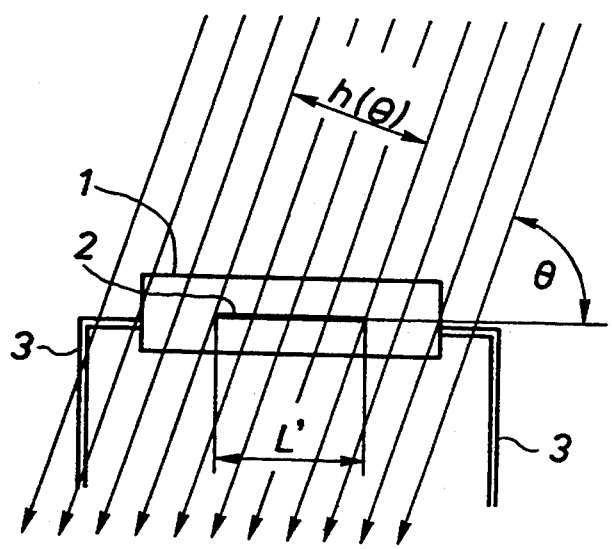
FIG. 15 is side view showing a situation of incident light to a photoelectric device in a second embodiment of the present invention.

In the second embodiment, it is explained that an inclination angle $\alpha'$ away from the central line of the prism surfaces of the optical device 4 is made smaller than the inclination angle $\alpha$ in the first embodiment. FIG. 15 shows a light path corresponding to the light path shown in FIG. 1 in the first embodiment. In the first and second embodiments, the same numerals designate the same or corresponding parts. In this embodiment, a photoelectric device 1, which has an effective receiving area width L' of the light receiving surface 2 smaller than the effective area width L in the first embodiment, and accordingly, the output curve of the photoelectric device 1 is different from that in the first embodiment.

Figure 16:
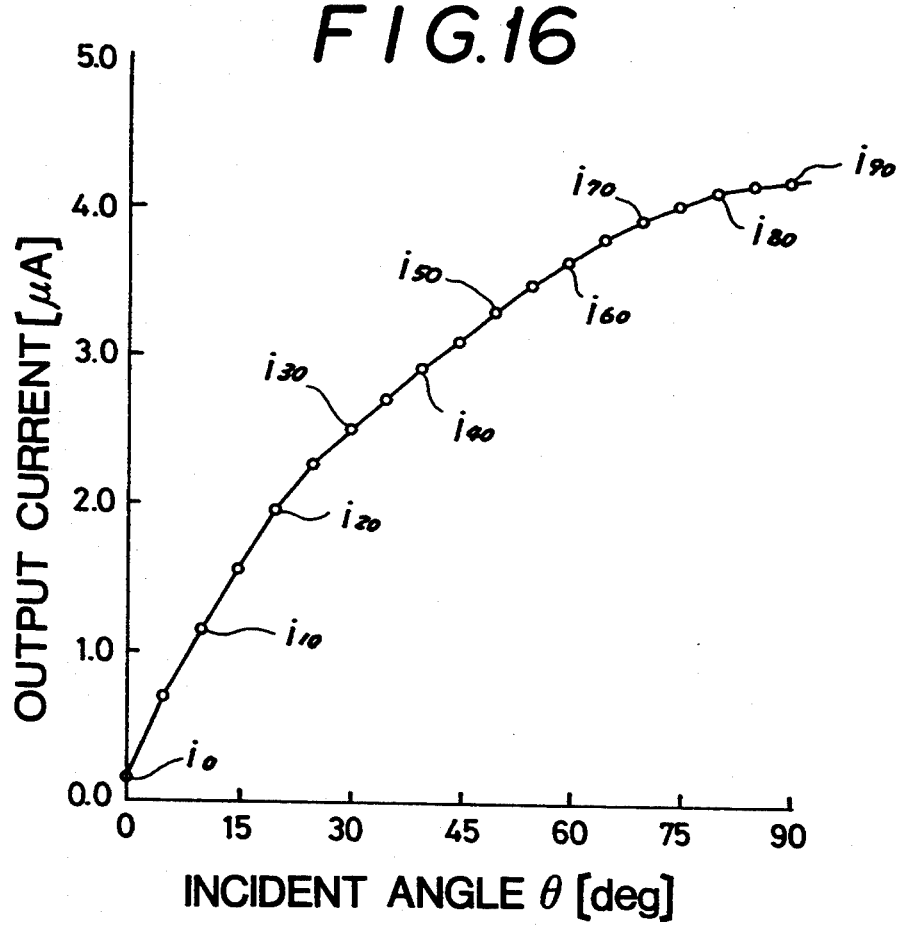
FIG. 16 is an output characteristic curve of a photoelectric device according to the second embodiment.

In FIG. 15, no obstacle is placed in front of the photoelectric device 1. Under this condition, measurement of output currents from the photoelectric device 1 when the inclination angle $\theta$ of parallel light flux which is radiated at the light receiving surface 2, and the light intensity of which has a constant distribution, is changed from 0° to 90° is shown in FIG. 16. FIG. 17 shows relative output ratios, each of which is a ratio of an output current at each incident angle $\theta$ to the maximum output current taken as 100% of the outputs shown in FIG. 16. The output curves in these figures are approximately sinusoidal curves. This proves that if parallel light flux having a constant light intensity is radiated at the light receiving surface 2 of the photoelectric device 1 in FIG. 15, the light flux width $h(\theta)$ which effectively reaches the light receiving surface 2 is $\sin \theta$ times the width L' as shown in FIG. 15, and theoretically has a sinusoidal curve because light received by the light receiving surface 2 is a parallel light flux having a constant distribution of light intensity and is proportional to the light flux width $h(\theta)$ which effectively reaches the light receiving surface 2, and because the outputs from the photoelectric device 1 are proportional to light intensity.

Figure 18:
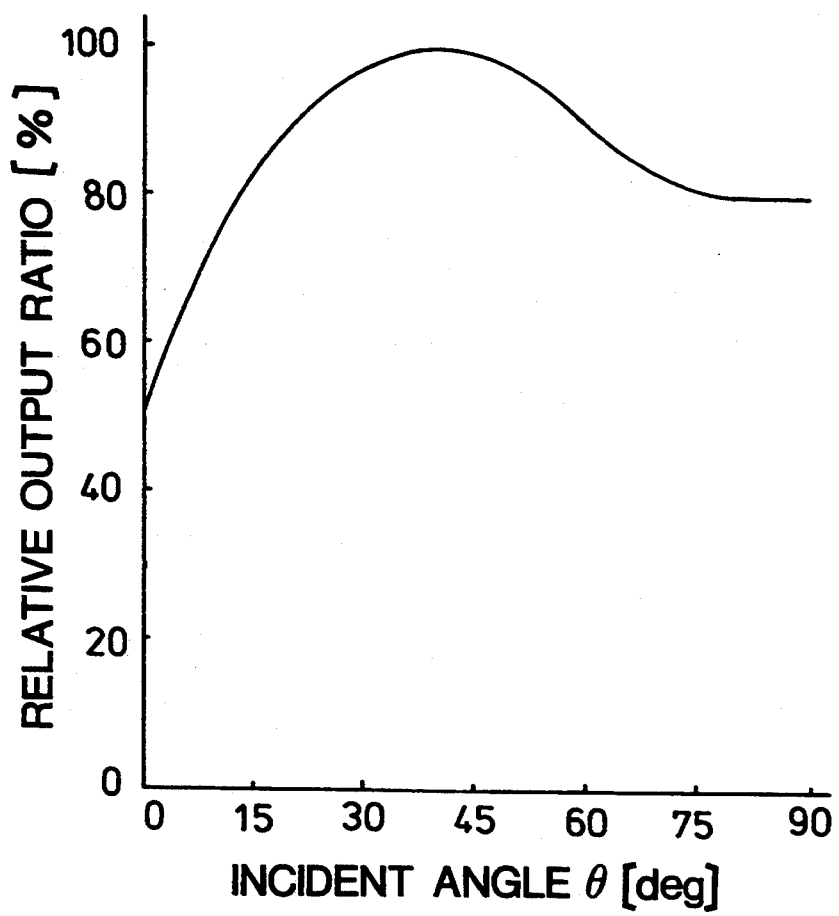
FIG. 18 is another relative output characteristic curve of a photoelectric device according to the second embodiment.

When the photoelectric device 1 having the above output curve is applied to a sunlight detection device for, for example, an air conditioner in an automobile, the device 1 preferably has a relative output ratio characteristic shown in FIG. 18. In other words, it is practical and preferable that a person in an automobile feels the highest temperature at an incident sunlight angle of around 40° and lower temperatures at larger incident angles. The relative output ratio characteristic is suitably changed according to the place in the cabin of the automobile where the light detection device is installed and in accordance with the shape of the automobile. A means to meet these requirements is described below is used. Since what is required in this embodiment is not levels of absolute values of the output currents but relative output ratios, the level of the output currents can be changed if necessary.

Figure 19:
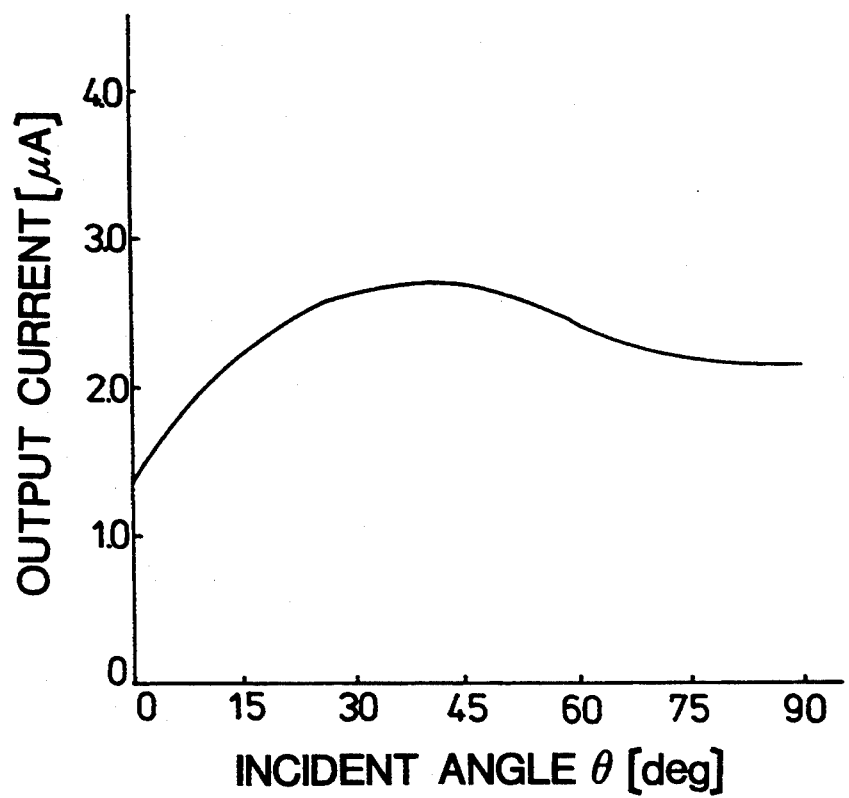
FIG. 19 is an output current characteristic curve.
Figure 20:
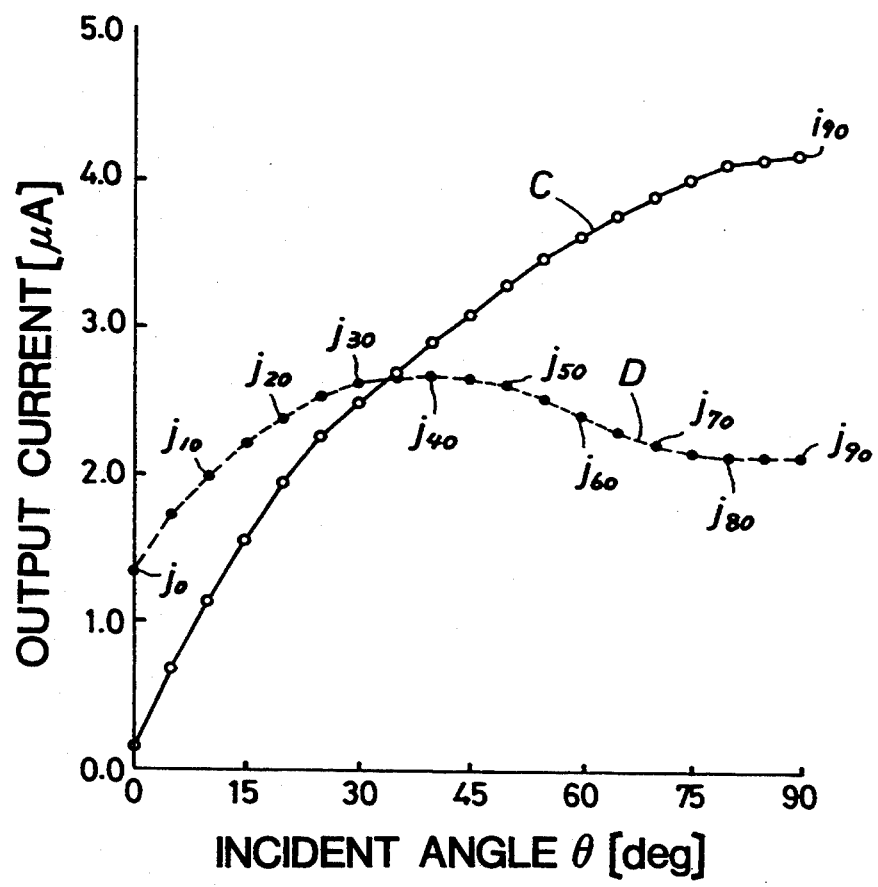
FIG. 20 is an adjusted output characteristic curve in the second embodiment.

FIG. 19 shows an output current characteristic which is obtained assuming that the current at the point of 100% on the relative output ratio curve shown in FIG. 18 is 2.7 $\mu$A. In FIG. 20, a characteristic curve C, which shows output currents obtained when there is no obstacle placed in front of the photoelectric device 1 (FIG. 15), and a characteristic curve D, which shows output currents obtained by converting required relative output ratios, are compared with each other. As shown in FIG. 20, to obtain the required characteristic curve D, the characteristic curve C must be converted into the characteristic curve D with some conversion means. In other words, the output currents at incident angles of 0° to around 35° need to be increased, while the output currents at incident angles of around 35° to 90° need to be decreased. The factors for the increase and decrease are different at each incident angle.

It is possible to increase or decrease the output currents at each incident angle by widening or narrowing the light flux width $h(\theta)$ which effectively works on the light receiving surface 2 of the photoelectric device 1 shown in FIG. 15. In other words, light intensity which the light receiving surface 2 receives is proportional to the light flux width $h(\theta)$ which effectively works on the light receiving surface 2, and the output currents from the photoelectric device 1 are proportional to light intensity which the light receiving surface 2 receives. To widen or narrow the light flux width $h(\theta)$, as shown in the sectional view in FIG. 21, an optical device 4, which comprises a group of prism surfaces made of resin material permeable to light, is placed between a light source and the photoelectric device 1 facing the light receiving surface 2 of the photoelectric device 1.

Figure 22:
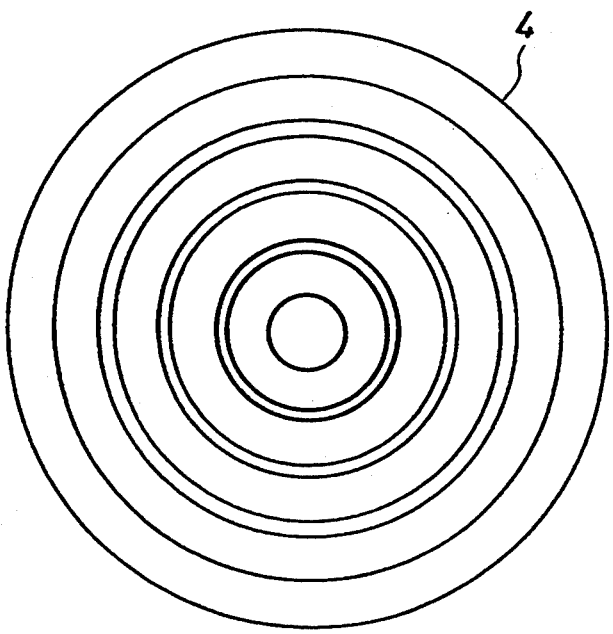
FIG. 22 is a bottom view of an optical device in the second embodiment.

On the side of the optical device 4 facing the photoelectric device 1, a plurality of steps of prism surfaces 4a, 4b, ... are formed. The inclination angle away from the optical axis and the radiation area (the width in the radiation direction of the prism surface containing its inclination angle) of each of the prism surfaces 4a, 4b, . . . are optimized for each step. Thus, as shown in FIG. 22, viewing the optical device from the photoelectric device 1, the optical device 4 has plural steps of prism surfaces which are formed conically around the optical axis.

Now, a method how to optimize the inclination angle and the radiation area of each prism surface in this embodiment is explained below.

(1) First of all, the incident angle $\hat{a}$ ⊧ of parallel light flux is divided from 90° to 0° at 10° increments. The output currents $j_{90}, j_{80}, \ldots,$ and $j_0$ at each incident angle are read from the required characteristic curve of outputs shown in FIG. 20. The light flux widths (the necessary light flux widths) which are necessary to obtain these output currents are calculated. To obtain the necessary light flux widths, each of $j_{90}, j_{80}, \ldots,$ and $j_0$ is divided by the output current $i_{90}$ at an incident angle $\theta=90°$ on the output current curve (characteristic curve C) which is obtained when there is no obstacle placed in front of the photoelectric device 1 shown in FIG. 16, and the light flux width, which effectively works on the light receiving surface 2 at an incident angle $\theta = 90°$ when there is no obstacle placed in front of the photoelectric device 1, that is, the width L' of the light receiving surface 2 of the photoelectric device 1 shown in FIG. 15 is multiplied by the quotient. In particular, the necessary light flux widths are obtained by the calculations of $H_{90} = L' \times j_{90}/i_{90}$, $H_{80} = L' \times j_{80}/i_{90}$, $H_{70} = L' \times j_{70}/i_{90}, \ldots$ and $H_0 = L' \times j_0/i_{90}$.

The calculated $H_{90}, H_{80}, H_{70}, \ldots,$ and $H_0$ are the respective widths necessary to obtain amplified or attenuated outputs for the light flux widths $h_{90}, h_{80}, h_{70}, \ldots$ and $h_0$ which work on the light receiving surfaces spaced apart at every one of the 10° steps.

Figure 23:
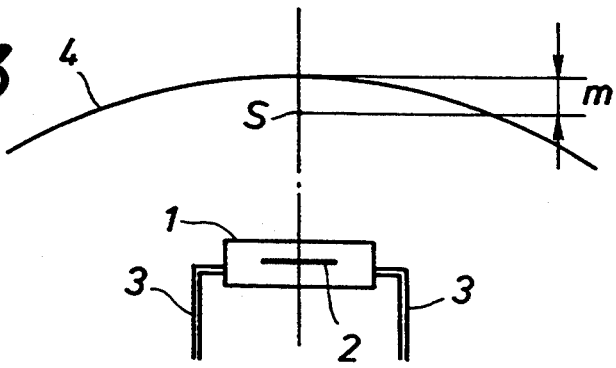
FIG. 23 is a sectional view showing flow a prism surface is determined in the second embodiment.

(2) Then, the inclination angles away from the optical axis and the radiation areas of the prism surfaces are so determined that the light flux having $H_{90}$, $H_{80}, H_{70}, \ldots,$ or $H_0$ reaches the light receiving surface 2 of the photoelectric device 1 at each angle without too much or too little. FIG. 23 is a sectional view showing a relationship between the contour (incident surface) of the spherical surface on the side of the optical device 4 facing a light source and the light receiving surface 2 of the photoelectric device 1 placed in a given place with respect to the top of the contour. On the central line in FIG. 23, a point S at a distance of m from the incident surface on the light source side of the photoelectric device 4 toward the light receiving surface 2 is defined as the origin of the first prism surface 4a, where m is a given thickness of the optical device 4, and is, for example, 1 mm thick.

Figure 24:
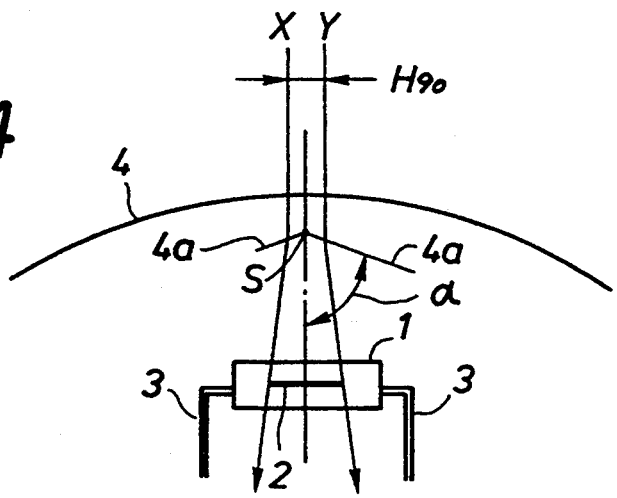
FIG. 24 is another sectional view showing how a prism surface is determined in the second embodiment.

(3) Then, as shown in FIG. 24, the inclination angle $\alpha$ away from the central line of the prism surface 4a originating from the point S is so determined that light X and Y on the boundaries between the width $H_{90}$ at $\theta = 90°$ and the outside area pass through the optical device 4 and the prism surface 4a (which forms single surface in three-dimension although two surfaces are shown on the right and left sides because FIG. 2 is a sectional view), and then the light X reaches the left end of the light receiving surface 2 of the photoelectric device 1 and the light Y reaches the right end side of the light receiving surface 2.

Light outside the X and Y of the necessary light flux width $H_{90}$ is diffused by the prism surface 4a and is not allowed to reach the light receiving surface 2.

Figure 25:
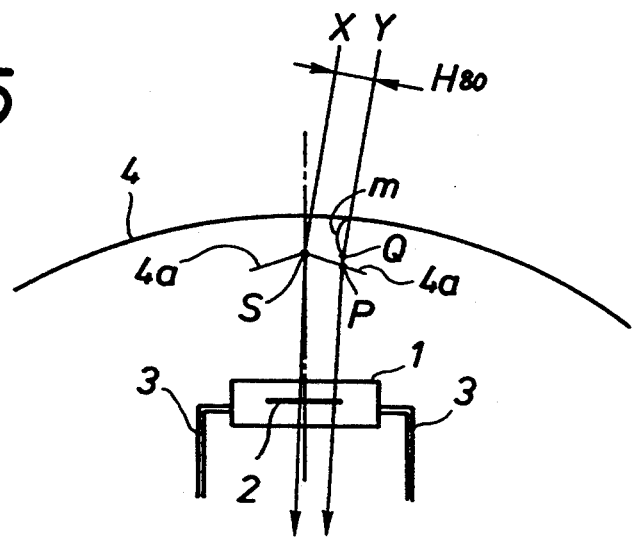
FIG. 25 is still another sectional view showing how a prism surface is determined in the second embodiment.

(4) FIG. 25 shows a situation in which light flux is radiated from a light source at the optical members 4 at an incident angle $\theta = 80°$. In FIG. 25, X is light which is part of incident light flux passing through the optical device 4 and the prism surface 4a, which has the inclination angle $\theta$ obtained in the step (3) and which reaches the left most side of the light receiving surface 2. Y is light which is parallel to and distant from the light X toward the right side by a necessary light flux width $H_{80}$ at $\theta = 80°$. P is a point where the light Y passes through the prism surface 4a when the light Y passes through the optical device 4 and the prism surface 4a to reach the light receiving surface 2. The point P is defined as the terminal point of the prism surface 4a. Thus, the inclination angle away from the central line and the radiation area of the prism surface 4a are determined.

Furthermore, with respect to the passage of the light Y in the optical device 4 to a point Q where the thickness of the optical device 4 is m, the point Q is also the origin of a second prism surface 4b.

In this case, light on the left side with respect to the light X having the necessary light flux width $H_{80}$ is refracted by the left prism surface 4a with respect to the origin S and is not allowed to reach the light receiving surface 2. In addition, light on the right side with respect to the light Y is refracted by the prism surface 4b and is not allowed to reach the light receiving surface 2.

Figure 26:
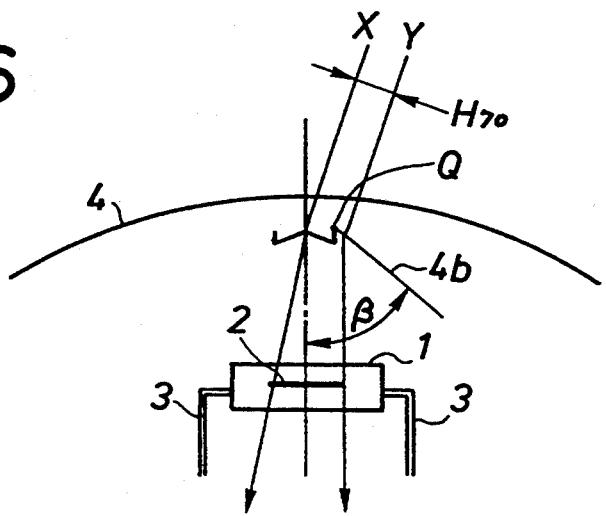
FIG. 26 is still another sectional view showing how a prism surface is determined in the second embodiment.

(5) FIG. 26 shows a situation in which light flux is radiated from a light source at the optical device 4 at an incident angle $\theta = 70°$. As in the case where light flux is radiated at an incident angle $\theta = 80°$ in the step (4), X is light which is part of light flux passing through the optical device 4 and the already determined prism surface 4a and reaching the light receiving surface 2 and which reaches the left most side of the light receiving surface 2, and Y is light which is parallel to and distant from the light X toward the right side by the necessary light flux width $H_{70}$. An inclination angle $\beta$ away from the central line of the prism surface 4b originating from the point Q is so determined that the light Y passes through the optical device 4 and the second prism surface 4b to reach the right end of the effective light receiving area of the light receiving surface 2.

According to this determination, the incident light flux outside the desired flux with at an incident angle $\theta = 90°$ and $\theta = 80°$, respectively, does not pass through the prism surface 4b so as to reach the light receiving surface 2, but is instead refracted. Thus, the necessary light flux widths at the incident angle $\theta = 90°$ and $\theta = 80°$ are not adversely affected. In other words, light in the area to the left of light X is refracted or reflected by the left side of the prism surface 4a with respect to the original point S and does not reach the light receiving surface 2. Light in the area to the right of the light Y is refracted by the prism surface 4b and does not reach the light receiving surface 2.

Figure 27:
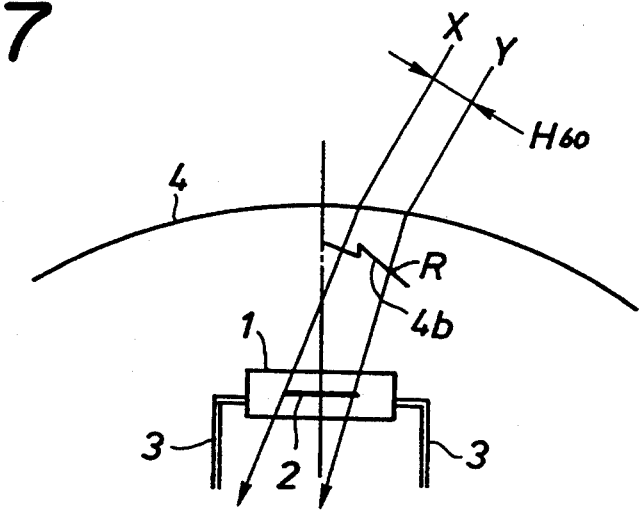
FIG. 27 is still another sectional view showing how a prism surface is determined in the second embodiment.

(6) FIG. 27 shows a situation in which light flux is radiated from a light source at an incident angle $\theta = 60°$, light X, and Y which are the same as those explained in the steps (4) and (5). A point R where the light Y passes through the prism surface 4b having an the inclination angle $\beta$ is defined as the terminal point of the prism surface 4b. Thus, the inclination angle away from the central line and the radiation area width of the prism surface 4b are determined. Light in the area to the left of the light X does not reach the light receiving surface 2, and light in the area to the right of the light Y is refracted by the prism surface 4c originating from the point R and does not reach the light receiving surface 2.

By repeating the above mentioned steps, the inclination angle away from the central line and the radiation area of each of the prism surfaces 4c, 4d, ..., are determined.

(7) In the range of incident angles of $\theta = 30° \sim 0°$, the outputs must be amplified. An amplification factor at each incident angle $\theta$ is calculated. The necessary light flux width $H(\theta)$ is calculated by multiplying the effective light flux width $h(\theta)$, which works on an uncovered light receiving surface, by the amplification factor.

Figure 28:
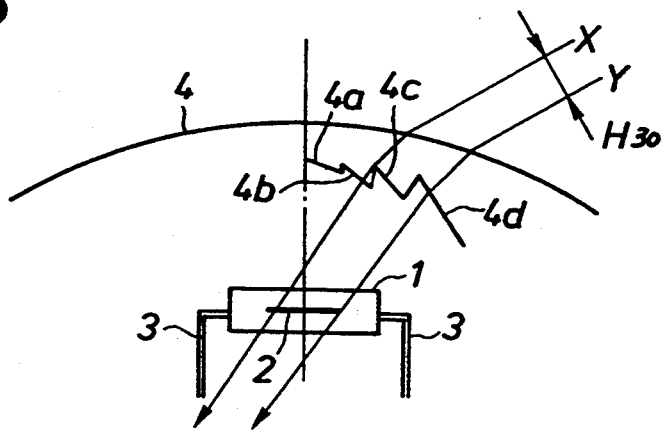
FIG. 28 is still another sectional view showing how a prism surface is determined in the second embodiment.
Figure 29:
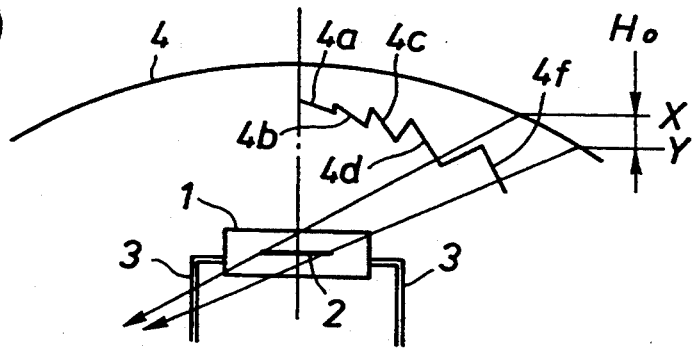
FIG. 29 is still another sectional view showing how a prism surface is determined in the second embodiment.

FIGS. 28 and 29 show radiation situations in which light flux is radiated at the optical device 4 at incident angles of $\theta=30°$ and $\theta=0°$, respectively. The prism surface for each incident angle can be so determined following the steps (3)–(5) that each of the necessary light flux widths $h_{30}$ and $h_0$ reaches the light receiving surface 2 of the photoelectric device 1.

By placing an optical device having a 5-step ring prism surface determined following the above mentioned method and facing the light receiving surface 2 of the photoelectric device 1, light flux having the light flux width necessary for each incident angle over the entire area can reach the light receiving surface without too much or too little amplitude, and a desired output current characteristic as shown by the characteristic D in FIG. 20 can be obtained.

In this embodiment, the prism surfaces are determined at steps of every 10°. Because the entire area for all the incident angles can be covered even at partition steps of 10°, the output characteristic can be substantially approximated to a necessary output current characteristic.

Third Embodiment

In this embodiment, it is explained that an optical device is made of semi-transparent material. If an optical device is made of semi-transparent material, for example, such as polycarbonate resin which has a transmission factor of 70% at a thickness of 1 mm, care must be taken because polycarbonate resin has a factor lower than that of transparent material and the inside diffusion effect becomes large to light.

Figure 30:
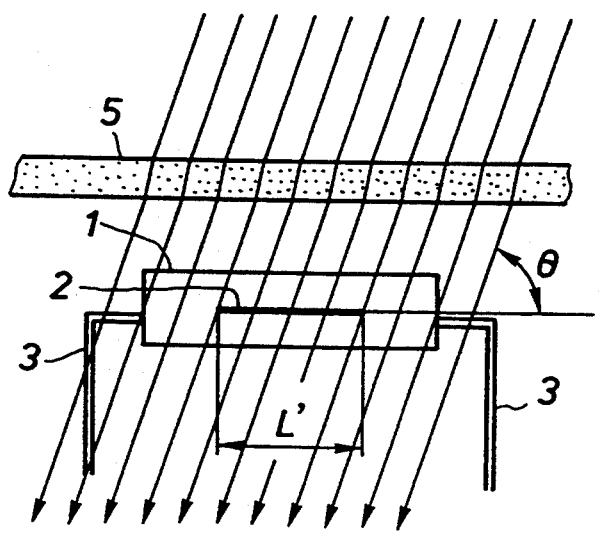
FIG. 30 is a sectional view of a light amount detection device according to a third embodiment of the present invention.
Figure 31:
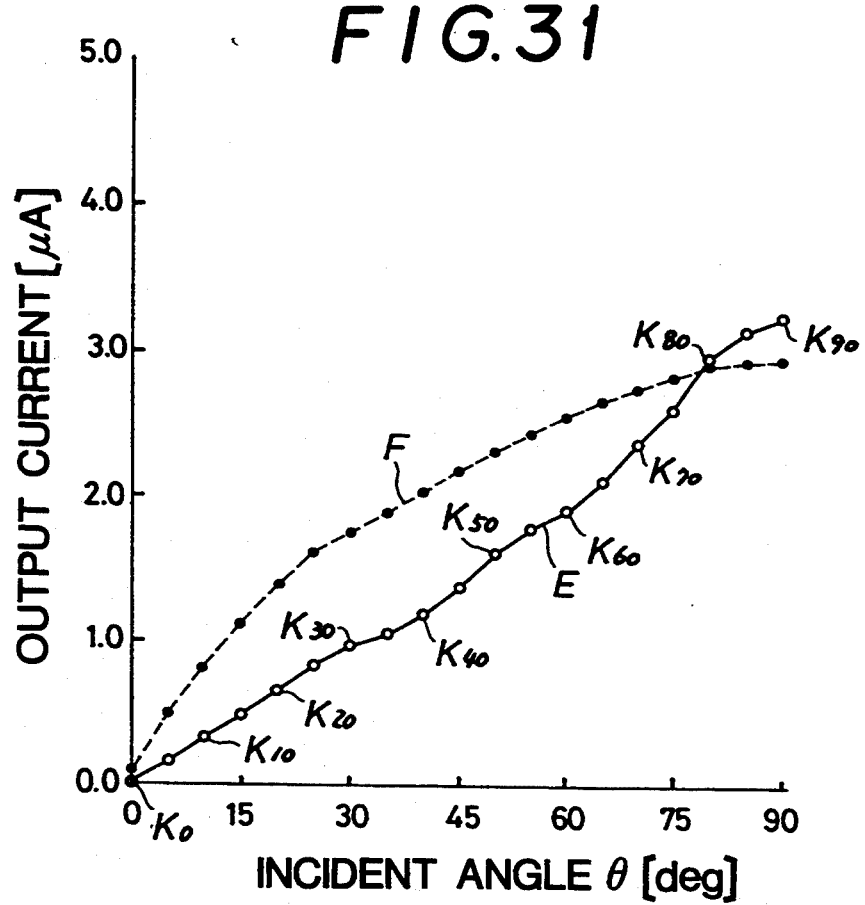
FIG. 31 is an output characteristic curve of an optical device in the third embodiment.

FIG. 30 shows a situation in which parallel light flux is radiated from the same light source as that in the second embodiment and directed at the light receiving surface 2 at the incident angle $\theta$ through a transparent resin plate 5, which is, for example, 1 mm thick and is placed parallel to the light receiving surface 2 between the light receiving surface 2 of the photoelectric device 1 and the light source. FIG. 31 shows a characteristic curve E of output currents from the photoelectric device 1 when the incident angle $\theta$ is changed from 0° to 90°, and a characteristic curve F obtained by multiplying the output currents by the transmission factor, 70%, of the material. The outputs are obtained by radiating parallel light flux having a constant distribution of light intensity from the light source at the light receiving surface 2 at an incident angle $\theta$ when there is no obstacle placed in front of the photoelectric device shown in FIG. 16 explained in the second embodiment. The characteristics curves E and F are compared with each other.

The difference between the characteristic curves E and F is caused by the difference in transmission factor dependent of the passages for light, that is, the passages through which light transmits in the resin plate, each of which is different for each incident angle, and is caused by other reasons aside from the transmission factor of the semi-transparent material. Other reasons are surface reflection, diffusion, or a combination of both.

Because attenuation due to surface reflection is low at an incident angle of $\theta=90°$ to around 70° and because influence of diffusion is large, the outputs are larger than those at the other incident angles, and sometimes become larger than those on the characteristic curve F. In addition, in the range of $\theta=60°$ to 0°, the outputs are dramatically low because they are attenuated by surface reflection and a low transmission factor due to a long light passage. As mentioned above, the prism surfaces need to be determined with regard to the properties of the semi-transparent material and through which it adversely affects the outputs.

Figure 32:
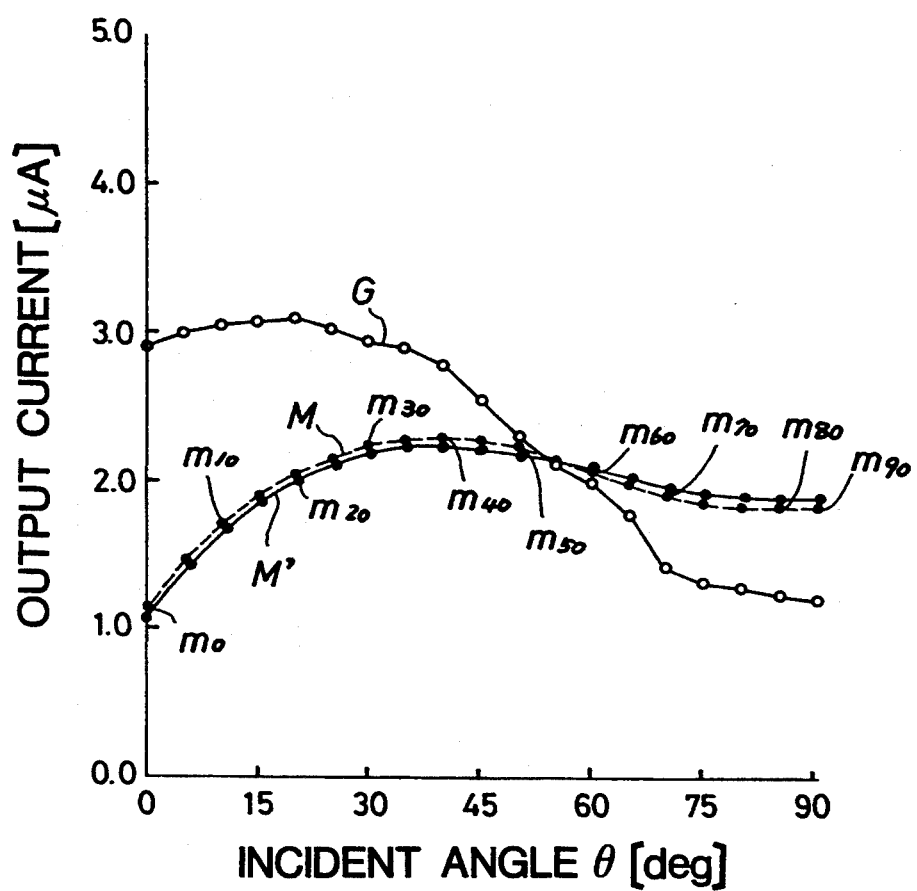
FIG. 32 is an output characteristic curve in the third embodiment.

FIG. 32 shows an output current characteristic M which is obtained as in the second embodiment assuming that the current at the point of 100% on the desired relative output ratio curve (FIG. 18) is 2.3 $\mu$A when the photoelectric device 1 is applied to a sunlight amount detection device, for example an air conditioner in an automobile. A characteristic curve G shows the values (that is, $m_{90} \times i_{90}/k_{90}$, $m_{80} \times i_{80}/k_{80}$, $m_{70} \times i_{70}/k_{70}$, ..., and $m_0 \times i_0/k_0$) which are obtained by calculating the comparisons (that is, $i_{90}/k_{90}$, $i_{80}/k_{80}$, $i_{70}/k_{70}$, ..., and $i_0/k_0$ which are obtained by comparing the output currents $i_{90}$, $i_{80}$, $i_{70}$, ..., and $i_0$ at the incident angles of $\theta=90°$, 80°, 70°, ..., and 0° on the output current characteristic curve shown in FIG. 16 which is obtained when no obstacle is placed in front of the optical device 1 and the output currents $k_{90}$, $k_{80}$, $k_{70}$, ..., and $k_0$ at the incident angles of $\theta=90°$, 80°, 70°, ..., and 0° on the characteristic curve E shown in FIG. 32, and then by multiplying the comparisons by the currents $m_{90}$, $m_{80}$, $m_{70}$, ..., and $m_0$ required at the incident angles of $\theta=90°$, 80°, 70°, ..., and 0° on the characteristic curve M.

In FIG. 32, the characteristic curve G is obtained by correcting the characteristic curve M taking into account the properties of semi-transparent material which adversely affects the outputs, and an optical device which has a desired output characteristics curve can be produced approximating the characteristic curve G.

Figure 33:
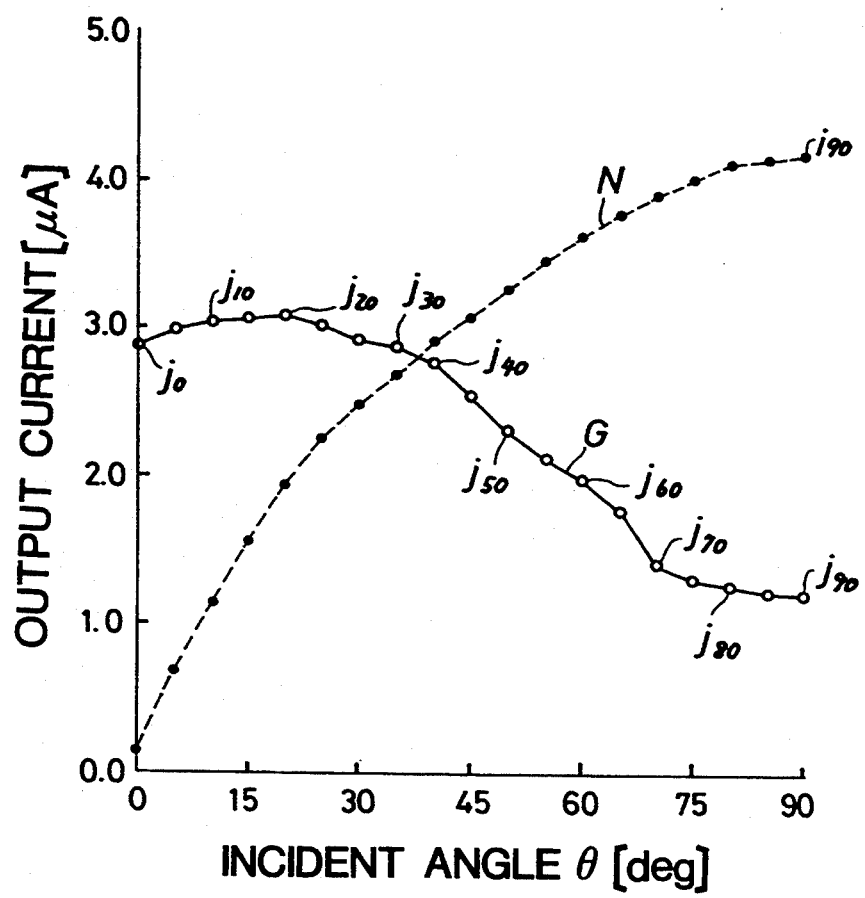
FIG. 33 is another output characteristic curve in the third embodiment.

FIG. 33 shows the above targeted characteristic curve G and an output current characteristic curve N, which is obtained when no obstacle is placed in front of the photoelectric device 1, to compare the curves with each other. In FIG. 33, to adjust the characteristic curve N to the characteristic curve G, the output currents at incident angles of $\theta=0°$ around 40° need to be amplified, and the outputs at incident angles of $\theta$=around 40°~90° need to be attenuated. The amplifications and attenuation factors are also different from those in the first and second embodiments in which transparent material is used.

To increase or decrease the output currents at each incident angle, as explained in the second embodiment, light intensity received by the light receiving surface 2 is increased or decreased by increasing or decreasing the light flux width $h(\theta)$ which effectively works on the light receiving surface 2 of the photoelectric device 1 shown in FIG. 15. As means for the adjustment, the inclination angle and the radiation area of each prism surface of an optical device, which is made of semi-transparent material and is a group of prism surfaces, are optimally determined.

Now, a method of determining is explained. First of all, the incident angle $\theta$ of parallel light flux is divided from 90° to 0° at steps of 10°, and readings of the necessary output currents $j_{90}$, $j_{80}$, $j_{70}$, ..., and $j_0$ at each incident angle are taken from the targeted output currents on the characteristic curve G shown in FIG. 33. Then, the necessary light flux widths $H_{90}$, $H_{80}$, $H_{70}$, ..., and $H_0$ are obtained to gain these output currents. They can be obtained by dividing $j_{90}$, $j_{80}$, $j_{70}$, ..., and $j_0$ by the output current $i_{90}$ at an incident angle of $\theta=90°$ on the characteristic curve N, and then by multiplying the quotients by the width L' of the tight receiving surface 2 of the photoelectric device 1. In more particular, $H_{90}=L'\times j_{90}/i_{90}$, $H_{80}=L'\times j_{80}/i_{90}$, $H_{70}=L'\times j_{70}/i_{90}$, ..., and $H_0=L'\times j_0/i_{90}$.

Then, the inclination angle away from the central line and the radiation area of each prism surface are determined one after another following the way explained in the second embodiment to allow the obtained necessary light flux width at each incident angle to reach the light receiving surface 2 without too much or too little.

Figure 34:
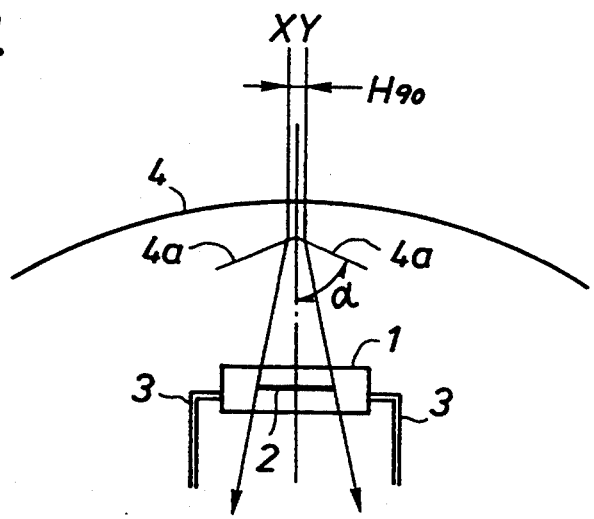
FIG. 34 is a sectional view showing how a prism surface is determined in the third embodiment.

FIG. 34 shows an example in which the prism surfaces are made of the abovementioned semi-transparent material and are formed to allow the necessary light flux width $H_{90}$ at an incident angle of $\theta=90°$ to reach the light receiving surface without too much or too little. At $\theta=90°$, the inclination angle of the prism surface is determined to allow a light flux width, which is different from the width in the second embodiment and is narrower than, or, 0.6 times as wide as that in the second embodiment, to reach the light receiving surface 2.

Figure 35:
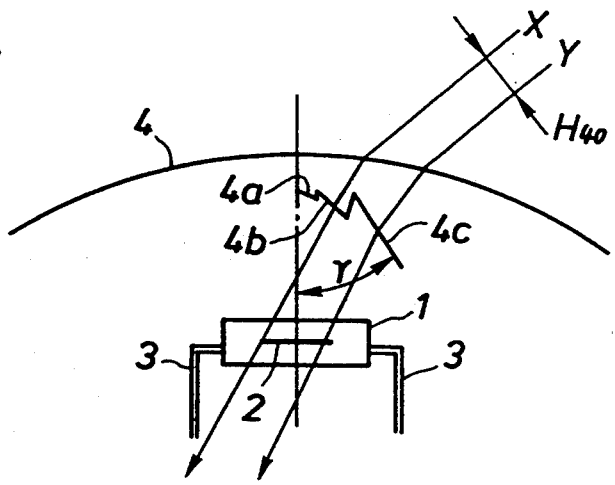
FIG. 35 is another sectional view showing how a prism surface is determined in the third embodiment.
Figure 36:
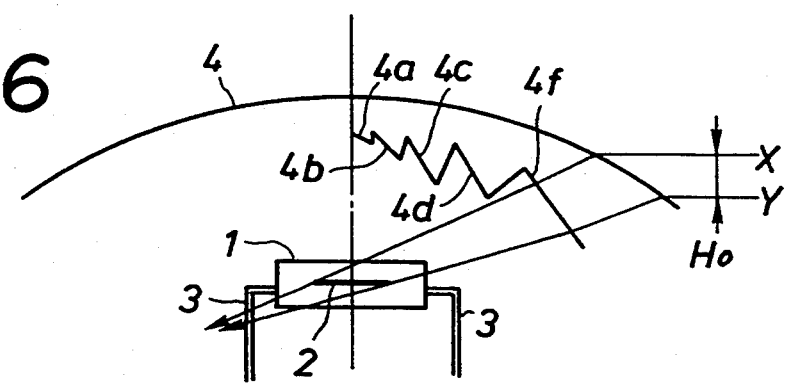
FIG. 36 is still another sectional view showing how a prism surface is de refrained in the third embodiment.

FIGS. 35 and 36 show examples in which the prism surfaces are formed such that the necessary light flux widths at incident angles of $\theta=40°$ and $\theta=0°$ reach the light receiving surface without too much or too little intensity. At $\theta=40°$ and $\theta=0°$ the inclination angles and the radiation areas of the prism surfaces are so determined that light flux having the widths, which are different from those in the second embodiment, or, one is 1.1 times as wide as that at $\theta=40°$ in the second embodiment, and the other is about two times as wide as that at $\theta=0°$ in the second embodiment. Accordingly, the inclination angles and the radiation areas of the plurality of prism surfaces are different from those in the second embodiment.

An output characteristic of the optical device, which has the prism surfaces obtained with the above mentioned method and is placed before the photoelectric device, is a characteristic curve M' shown in FIG. 32. The characteristic curve M' is substantially approximated to the characteristic curve M.

Fourth Embodiment

In this embodiment, as in the above mentioned embodiment, it is explained that an optical device made of semi-transparent material is used.

Figure 37:
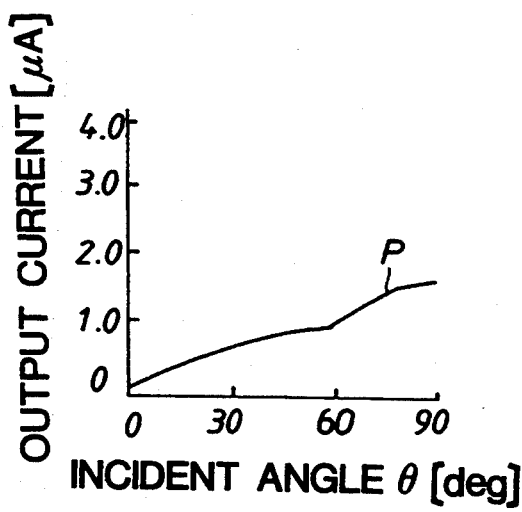
FIG. 37 is an output characteristic curve in a fourth embodiment.

FIG. 37 shows an output characteristic of the optical device obtained under the condition where a semitransparent resin plate having a constant thickness is placed in a given place before and in parallel to the light receiving surface, and light having a constant light amount is radiated at the light receiving surface through the resin plate at different incident angles. The output characteristic shown in FIG. 37 is obtained when part of light, which is radiated when there is nothing placed before the light receiving surface of the photoelectric device as shown in FIG. 2, is transmitted through the resin plate where the light is subject to diffusion effect of the plate and is received by the light receiving surface. In particular, in the area of incident angles of $\theta=70°\sim90°$, or, near the area right over the light receiving surface, the outputs are larger than those at incident angles of $\theta=0°\sim60°$ because less light is reflected by the surface of the resin plate, light intensity inside the resin plate becomes high, and intensified light emerging from the resin plate works more intensely on the light receiving surface.

An example using an optical device made of this semi-transparent material is explained.

Figure 38:
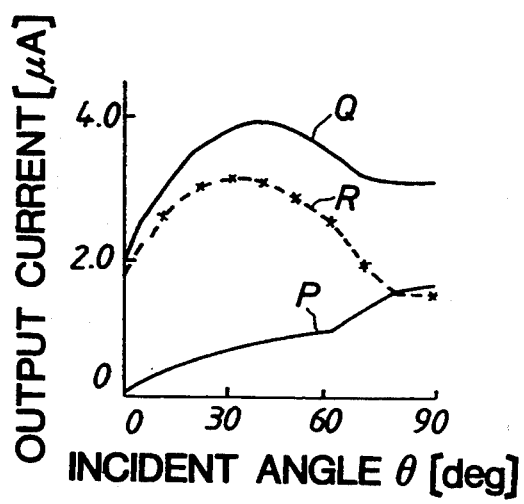
FIG. 38 is another output characteristic curve in the fourth embodiment.

FIG. 38 shows output characteristic curves, and a curve Q is a desired output characteristic. In semi-transparent material, because the outputs having the output characteristic P are added because of diffusion effect, the output characteristic Q can not be obtained if the resin surfaces are determined based on the necessary light flux width for transparent material. For this reason, the prism surfaces are determined targeting a characteristic R which is obtained by subtracting the output characteristic P under diffusion effect from the desired output characteristic Q.

Figure 39:
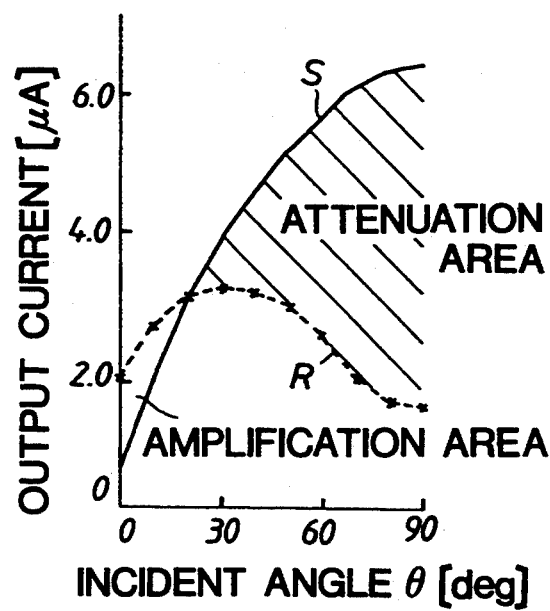
FIG. 39 is still another output characteristic curve in the fourth embodiment.

FIG. 39 shows the above targeted characteristic R compared with a characteristic curve S which is obtained when there is nothing placed before the photoelectric device. As shown in FIG. 39, the outputs at incident angles of $\theta=0°$ to around 20° need to be amplified and attenuated at around 20°~90°. Accordingly, the necessary light flux widths $H'_{90}$, $H'_{80}$, ..., and $H'_0$ are obtained by calculating the amplification or attenuation factors at intervals of 10°, and then by multiplying the light flux widths $h_{90}$, $h_{80}$, ..., and $h_0$, which effectively work on the light receiving surface at each $\theta$ and are obtained in the situation where there is nothing placed before the photoelectric device, by the factors. The inclination angles and the radiation areas of the plural steps of concentric prism surfaces are so determined that only the necessary light flux widths $H'_{90}$, $H'_{80}$, ..., and $H'_0$ reach the light receiving surface at each incident angle $\theta$. For example, at $\theta=90°$, the attenuation factor is larger than that in the first embodiment and the necessary light flux width is narrower than that in the first embodiment.

Figure 40:
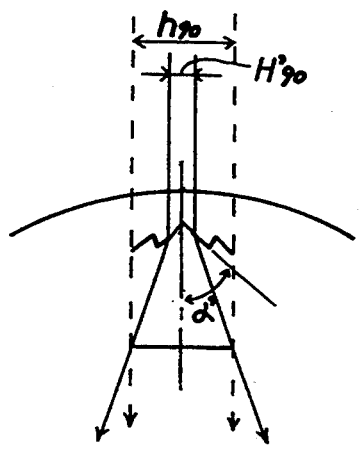
FIG. 40 is a sectional view showing how a prism surface is determined in the fourth embodiment.

Taking cautions to the above properties, as shown in FIG. 40, an inclination angle $\alpha'$ away from the central line of the prism surfaces are so determined that the light flux width $H'_{90}$ narrower than the necessary light flux width $H_{90}$ in the first embodiment reaches the light receiving surface without too much or too little. Subsequently, the inclination angles and the radiation areas of the plurality of steps of prism surfaces are determined according to $H'_{80}$, $H'_{70}$, ..., and $H'_0$ at each angle following the ways in the first embodiment.

Figure 41:
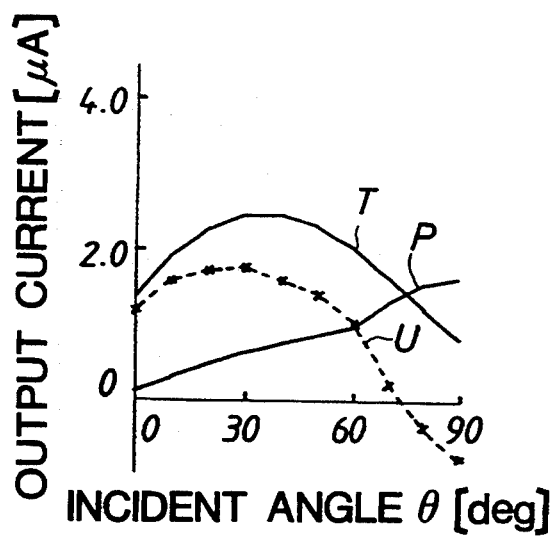
FIG. 41 is an output characteristic curve of a modified optical device in the fourth embodiment.
Figure 42:
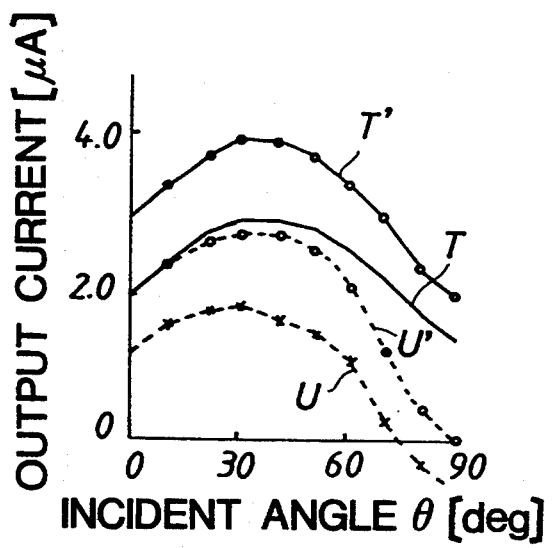
FIG. 42 is an output characteristic curve of another modified optical device in the fourth embodiment.

FIG. 41 shows a modification of this embodiment, and a characteristic curve T is a desired output characteristic. A pseudo targeted characteristic curve U is obtained by subtracting the outputs under diffusion effect (characteristic curve P) from the characteristic curve T. Some outputs on the characteristic curve U are negative. However, as matter of fact, the necessary light flux widths are never negative, and the characteristic curve T' and U', which are shown in FIG. 42.

Figure 43:
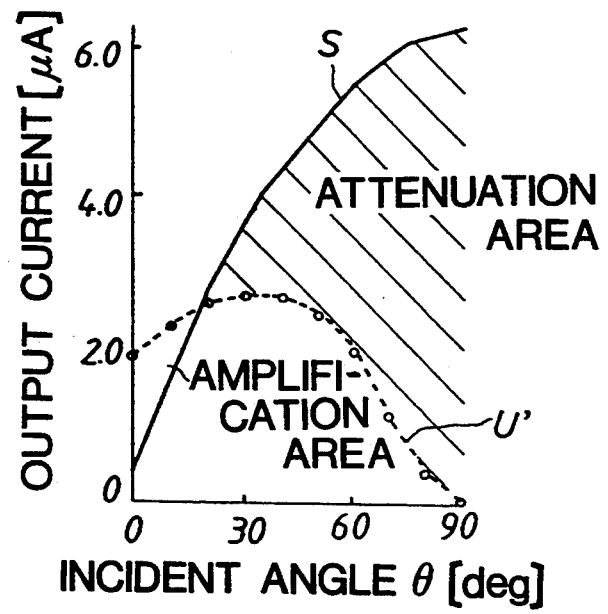
FIG. 43 is an output characteristic curve of still another modified optical device in the fourth embodiment.

FIG. 43 shows comparisons of the boosted characteristic curves U' and the output characteristics are obtained under the condition where there is nothing placed before the photoelectric device. Based on the comparisons, the amplification or attenuation factor is obtained at each incident angle $\theta$, and then the necessary light flux widths $H_{90}$, $H_{80}$, ..., and $H_0$ are obtained. Based on these $H_{90}$, $H_{80}$, ..., and $H_0$, the inclination angles and the radiation areas are determined following the same way as those in the first and second embodiments. Accordingly, semi-transparent material can be also used. Some desired characteristic curves sometimes have particularly high amplification factors at $\theta=0°$ to around 30°, and the prism surfaces cannot be determined. In that case, the amplification factors are relatively lowered by increasing the attenuation factor of the semitransparent material to suppress the influence inside the material, which allows the prism surfaces to be determined.

Figure 44:
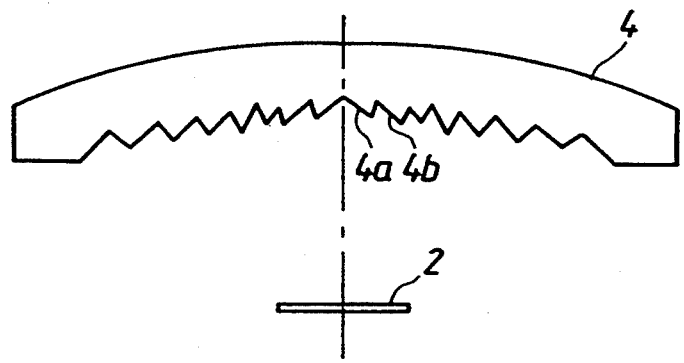
FIG. 44 i s a sectional view showing an arrangement of a light amount detection device according to the fourth embodiment.

FIG. 44 shows an optical device 4 which is, following the above mentioned procedure, formed of semitransparent material which has a transmission factor of 70% at a thickness of 1 mm. The prism surfaces facing the light receiving surface 2 of the photoelectric device 5 have the inclination angles and the radiation areas which are determined at incident angle intervals of 5°. Eight prism surfaces are so determined that the light flux widths are attenuated at incident angles of $\theta=90°$ to around 30° and are amplified at incident angles of $\theta=$around 30° to 0°.

Figure 45:
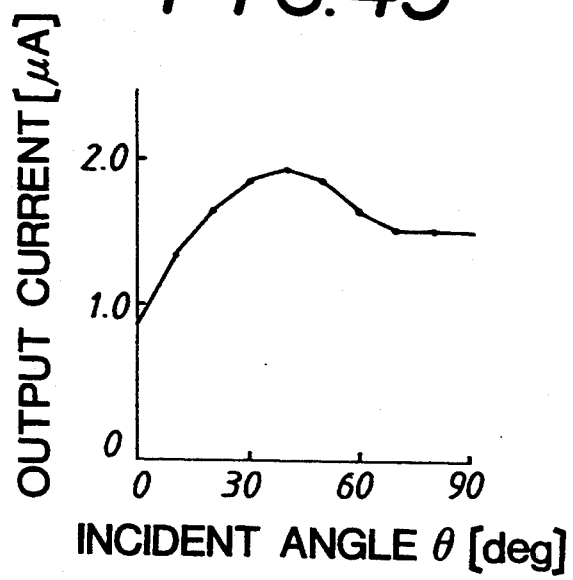
FIG. 45 is an output characteristic curve in the fourth embodiment.

FIG. 45 shows an output characteristic of the photoelectric device versus incident angles when the optical device is placed in a given place before the light receiving surface of the photoelectric device. The output characteristic is favorable for a desired output characteristic.

Fifth Embodiment

In the fifth embodiment, it is explained how the prism surfaces are determined when the incident surface on the light source side of the optical device, which is a group of prism surfaces, is embossed by transferring a satin-finished surface by sandblasting or chemical etching to suppress brilliance for an aesthetic appearance.

When the surface of an optical device is embossed, light from a light source is irregularly reflected by the embossed surface and incident light is not aligned in a direction because the light is reflected by the rough surface, accordingly, the necessary light flux width cannot reach the light receiving surface without fail and influences an output current characteristic. Degree of the influence depends on how rough and deep the embossing is and changes from incident angle to incident angle. For this reason, degree of the influence due to the roughness and depth of embossing is determined at each incident angle in advance, and the determined influence degree needs to be considered as a correction amount to obtain the necessary light flux width when the inclination angles and the radiation areas of the prism surfaces are determined.

To predetermine a correction amount, an output characteristics obtained when the surface of an optical device for use facing a light source is embossed, and an output characteristic obtained when the surface of the optical is not embossed are compared with each other. For this reason, an optical device having the prism surfaces, each of which has the inclination angle and the radiation area to obtain a desired output characteristic, is produced in a metal mold having a polished incident surface. Then, the metal mold is embossed, and another optical device is produced in the embossed metal mold. Outputs from the two different optical devices are measured and compared with each other to determine a correction amount.

Figure 46:
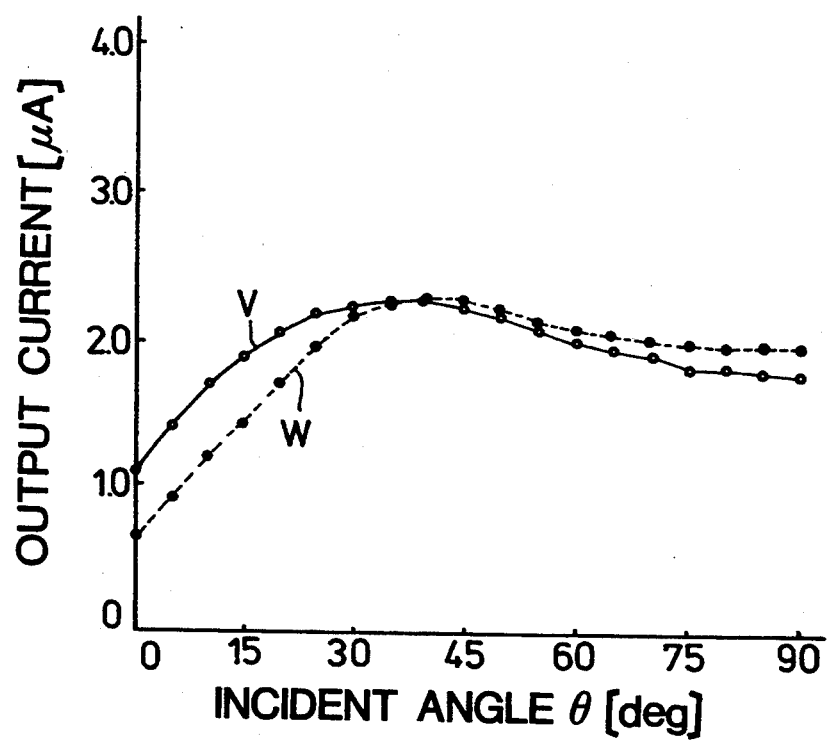
FIG. 46 is an output characteristic curve in a fifth embodiment.

FIG. 46 shows an example in which an output characteristic of an embossed optical device and an output characteristic of a non-embossed optical device are compared in advance. In this example, the same optical device as that in the third embodiment is produced in a metal mold. Then the metal mold is embossed and the other optical device is produced in the embossed metal mold under the same conditions as those of the non-embossed optical device. In FIG. 46, a characteristic curve V shows outputs which are obtained with the non-embossed optical device and a characteristic curve W which is obtained with the embossed optical device. In more particular, the characteristic curves V and W are obtained under the condition where the embossing has the same level as that of #BK=155G. As shown in FIG. 46, because of the influence by the embossing on the characteristic, the output currents decrease at incident angles of 0° to 30°, do not fluctuate with a large amplitude at incident angles of around 30° to around 70°, and increase at incident angles of around 70° to 90°.

When the prism surfaces are determined, an output characteristic of an embossed optical device can be changed to a desired characteristic by determining increase or decrease ratio at each incident angle and then by correcting the necessary light flux width at each incident angle. When an embossed optical device is used, the prism surface at each incident angle is so determined following the above-mentioned steps (1)–(7) that the corrected necessary light flux width reaches the effective light receiving surface of the light receiving device without too much or too little.

In this case, an adaptable level of the embossing is up to that of #TH110 (Form Tanazawa Hakko Co.), and if the level becomes rougher than that, correction becomes hard because the outputs particularly decrease at around 0°.

Sixth Embodiment

In this sixth embodiment, to apply an optical device into a sun light amount detection device for an air conditioner in an automobile, an optical device, which is a group of prism surfaces made of black polycarbonate resin having a transmission factor of 70% to light having a wavelength of 800 μm (a near infrared ray) and embossed to a given level (specifically the same level as #BK-155G), is used.

Figure 47:
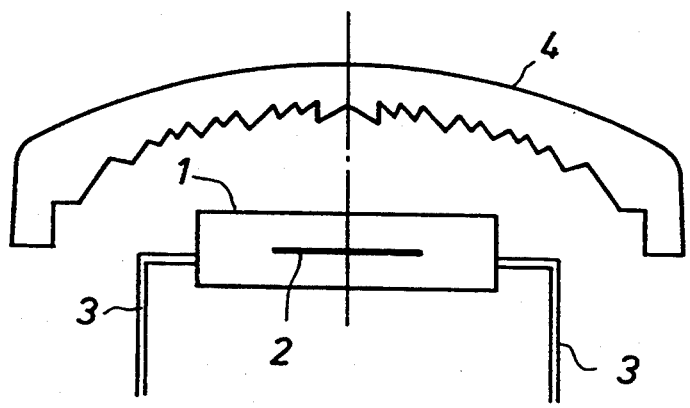
FIG. 47 is a sectional view of a light amount detection device according to a sixth embodiment of the present invention.

FIG. 47 shows an optical device which is a group of prism surfaces each of which has the inclination angle away from the central line and the radiation area which are determined at incident angle intervals of 5° and are corrected by combining a correction amount under the condition where the semi-transparent material explained in the third and fifth embodiments is used and a correction amount under the condition where an optical device is embossed. In FIG. 47, because the partition interval is 5°, ten prism surfaces are formed, and each prism surface has the optimal inclination angle and the radiation area.

Figure 21:
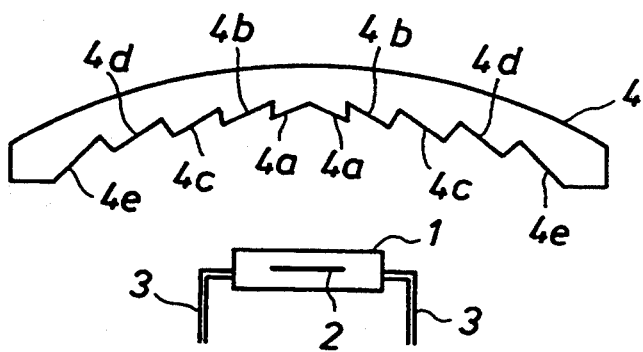
FIG. 21 is a sectional view of the entire light amount detection device according to the second embodiment.
Figure 48:
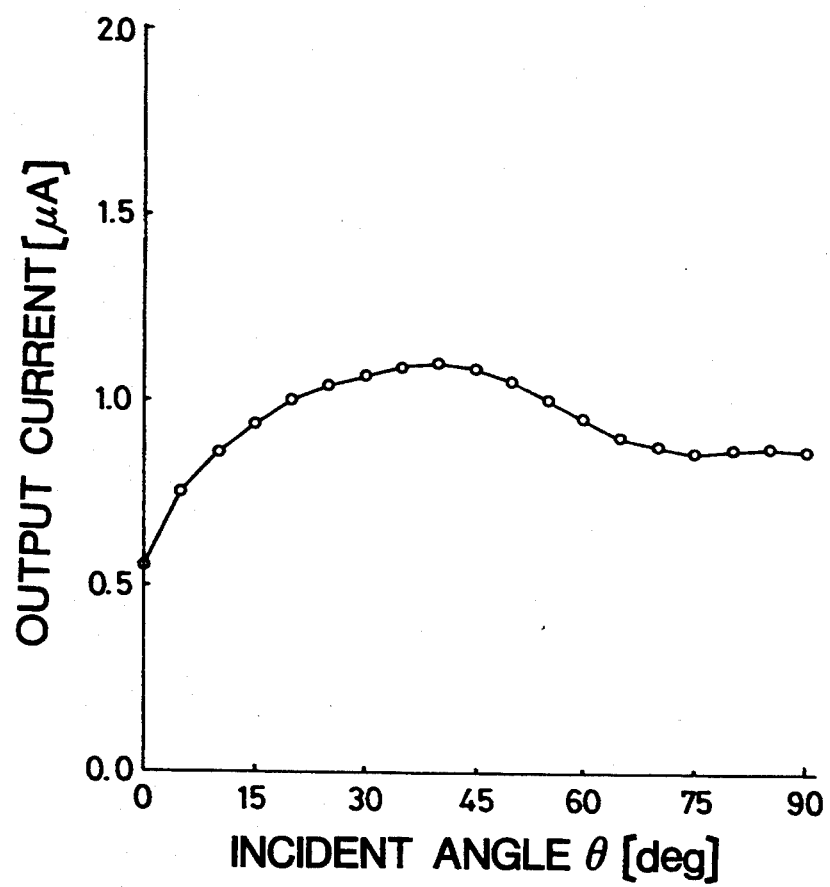
FIG. 48 is an output characteristic curve in a sixth embodiment.
Figure 49:
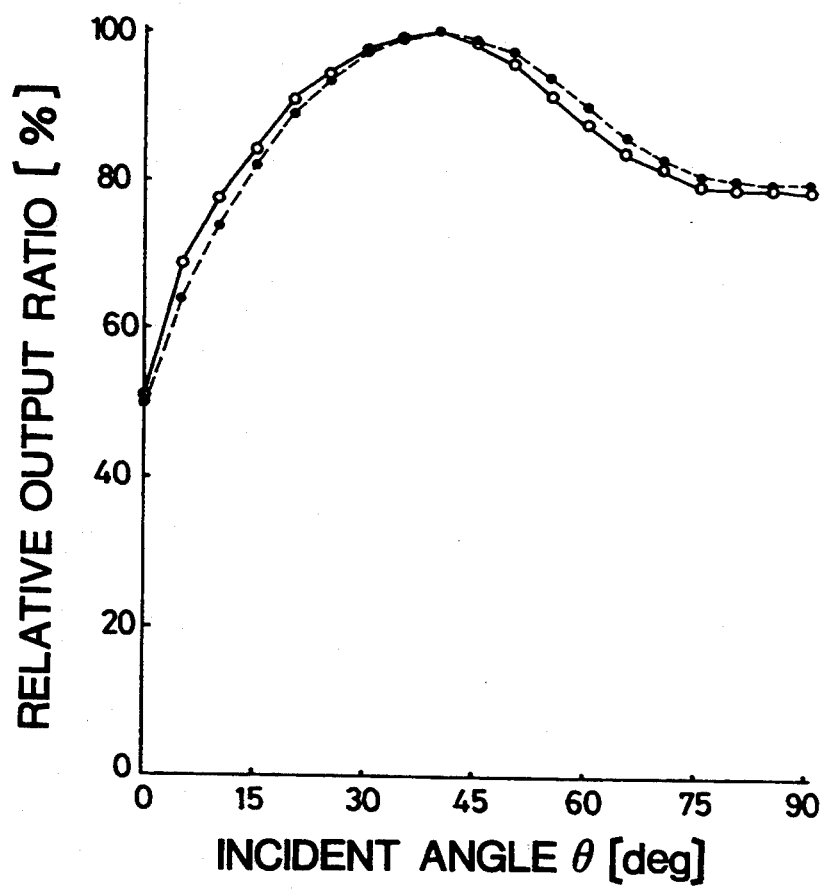
FIG. 49 is another output characteristic curve in the sixth embodiment.

FIG. 48 shows an output current characteristic obtained under the condition where the optical device shown in FIG. 47 is arranged as shown in FIG. 21 and incident angles with respect to the light receiving surface of the optical device are changed. FIG. 49 shows a relative output characteristic with a solid line which is obtained by calculating ratios of the output currents at each incident angle $\theta$ shown in FIG. 48 to the maximum output current assuming that the maximum output is 100%, and the desired relative output ratio characteristic shown in FIG. 18 with a broken line to compare with each other. FIG. 48 shows that the output characteristic obtained by measuring outputs is substantially approximated to the desired relative output ratio characteristic.

The above description and the accompanying drawings are merely illustrative of the application of the principles of the present invention and are not limiting. Numerous other arrangements which employ the principles of the invention and which fall within its spirit and scope may be readily devised by those skilled in the art. Accordingly, the invention is not limited by the foregoing description, but only limited by the scope of the appended claims.

What is claimed is:

1. A thermal load detection device for detecting the thermal load due to incident light from a light source comprising:
   a photoelectric device having a light receiving surface and means for producing an electrical output signal in accordance with the intensity of light received by the light receiving surface;
   and an optical member receptive of incident light from the light source and comprising a plurality of prism surfaces disposed between the light source and the light receiving surface of said photoelectric device for redirecting incident light from the light source to the light receiving surface of the photoelectric device;
   wherein respective prism surfaces have a predetermined surface area and an angle of inclination with respect to a central axis of the optical member such that the electrical output signal of the photoelectric device corresponds to a thermal load produced by the incident light in the vicinity of the light intensity detection device.

2. A thermal load detection device according to claim 1; wherein the prism surfaces of the optical member are formed concentrically around the optical axis of the photoelectric device.

3. A thermal load detection device according to claim 1; wherein the angle of inclination with respect to the central axis of the optical device and the surface area of each respective prism surface are determined such that a light flux width corresponding to a desired electrical output signal from the photoelectric device at each incident angle of light is re-directed by respective prism surfaces to reach the light receiving surface of the photoelectric device.

4. A thermal load detection device according to claim 1; wherein the optical device is formed of a semi-transparent material, and the angle of inclination with respect to the central axis of the optical device and the surface area of respective prism surfaces are determined according to a transmission factor of the optical device.

5. In a temperature control apparatus for controlling the temperature in the cabin of an automobile: a thermal load detection device according to claim 1, wherein the photoelectric device and the optical member are mounted on a dashboard in the cabin of the automobile such that the optical member is exposed to incident solar radiation through a windshield of the automobile.

6. A thermal load detection device according to claim 1; wherein the angle of inclination of respective prism surfaces is such that the intensity of light directed from the optical member to the light-receiving surface of the photoelectric device has a maximum value when the angle of incidence of incident light is in the range of 30° to 50°.

7. A thermal load detection device according to claim 1; wherein the optical member includes means for diffusing light incident on the optical member to decrease the light reaching the light receiving surface of the photoelectric device when the angle of incidence of incident light is above a predetermined value.

8. A thermal load detection device according to claim 1; wherein an outer surface of the optical member facing the light source is convex and wherein respective prism surfaces have an angle of inclination and a surface area such that light received by the light receiving surface of the photoelectric device is decreased when the angle of incidence of incident light from the light source is above a first predetermined value and is increased when the angle of incidence of the incident light from the light source is below a second predetermined value.

9. A light intensity detection device for detecting the intensity of incident light from a light source comprising: a photoelectric device having a mounting surface for mounting in the cabin of an automobile, a light receiving surface and means for producing an electrical output signal in accordance with the intensity of light radiated at the light receiving surface thereof;
   and an optical device disposed between the light source and the light receiving surface of said photoelectric device;
   wherein said optical device comprises a plurality of prism surfaces each of which is disposed at an angle of inclination with respect to an optical axis of the photoelectric device and has a radiation area which is predetermined such that the electrical output signal from said photoelectric device corresponds to the thermal load in the automobile from the light source cabin due to the incident light.

10. A light intensity detection device according to claim 9; wherein said photoelectric device is mounted on a dashboard in said automobile cabin such that the optical device is exposed to incident solar radiation through a windshield of the automobile.

11. A light intensity detection device according to claim 9; wherein said prism surfaces of said optical device are formed concentrically around the optical axis of said photoelectric device.

12. A light intensity detection device according to claim 11; wherein the angle of inclination with respect to the optical axis of the photoelectric device and the radiation area of each of the respective prism surfaces are such that a light flux width corresponding to a desired electrical output signal from said photoelectric device at each incident angle of incident light is redirected by respective prism surfaces to said light receiving surface of said photoelectric device.

13. A light intensity detection device according to claim 11; wherein said optical device is made of semi-transparent material, and the angle of inclination with respect to the optical axis and the radiation area of respective prism surfaces are determined according to a transmission factor of said optical device.

14. A light intensity detection device according to claim 11; wherein an incident light surface of said optical device is satin finished, and the angle of inclination with respect to the optical axis and the radiation area of respective prism surfaces are determined according to the density of said satin finish.

15. A luminous flux intensity detection device comprising: a photoelectric device having a luminous flux receiving surface and means for producing an electrical output signal in accordance with the intensity of luminous flux received by the luminous flux receiving surface; and an optical member receptive of incident luminous flux from a radiation source, the optical member comprising a plurality of prisms disposed between the radiation source and the luminous flux receiving surface of the photoelectric device; wherein respective prisms have a surface area and an angle of orientation with respect to a central axis of the optical member such that the electrical output signal of the photoelectric device corresponds to a thermal load produced by the incident luminous flux in the vicinity of the luminous flux detection device.

16. A luminous flux intensity detection device according to claim 15; wherein the photoelectric device has a light receiving surface, and the means for producing an electrical output produces an electrical output in accordance with the intensity of light received by the light receiving surface.

* * * * *